(12) United States Patent
Benjamin et al.

(10) Patent No.: US 7,837,445 B2
(45) Date of Patent: Nov. 23, 2010

(54) AIRFOIL SHAPE FOR A TURBINE NOZZLE

(75) Inventors: Edward D. Benjamin, Simpsonville, SC (US); David J. Humanchuk, Simpsonville, SC (US); Daniel D. Snook, Moore, SC (US); Thomas W. Vandeputte, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 691 days.

(21) Appl. No.: 11/848,311

(22) Filed: Aug. 31, 2007

(65) Prior Publication Data

US 2009/0068005 A1 Mar. 12, 2009

(51) Int. Cl.
*F01D 5/14* (2006.01)
(52) U.S. Cl. .............................. 416/223 A; 416/DIG. 2
(58) Field of Classification Search ............. 416/223 A, 416/223 R, DIG. 2, DIG. 5
See application file for complete search history.

(56) References Cited

U.S. PATENT DOCUMENTS

| | | | |
|---|---|---|---|
| 5,980,209 A | 11/1999 | Barry et al. | |
| 6,461,109 B1 * | 10/2002 | Wedlake et al. | 416/223 R |
| 6,832,897 B2 * | 12/2004 | Urban | 416/223 A |
| 7,467,926 B2 * | 12/2008 | Stampfli et al. | 416/223 A |
| 7,520,728 B2 * | 4/2009 | Sleiman et al. | 416/223 R |

* cited by examiner

*Primary Examiner*—Edward Look
*Assistant Examiner*—Dwayne J White
(74) *Attorney, Agent, or Firm*—Edward J. Smith; Ernest G. Cusick; Frank A. Landgraff

(57) ABSTRACT

An article of manufacture having a nominal profile substantially in accordance with Cartesian coordinate values of X, Y and Z set forth TABLE I. The X and Y values are distances in inches, which when connected by smooth continuing arcs define airfoil profile sections at each distance Z in inches The X, Y and Z distances may be scalable as a function of the same constant or number to provide a scaled up or scaled down airfoil section for the nozzle. The nominal airfoil given by the X, Y and Z distances lies within an envelope of +0.130 inch to −0.030 inch.

10 Claims, 6 Drawing Sheets

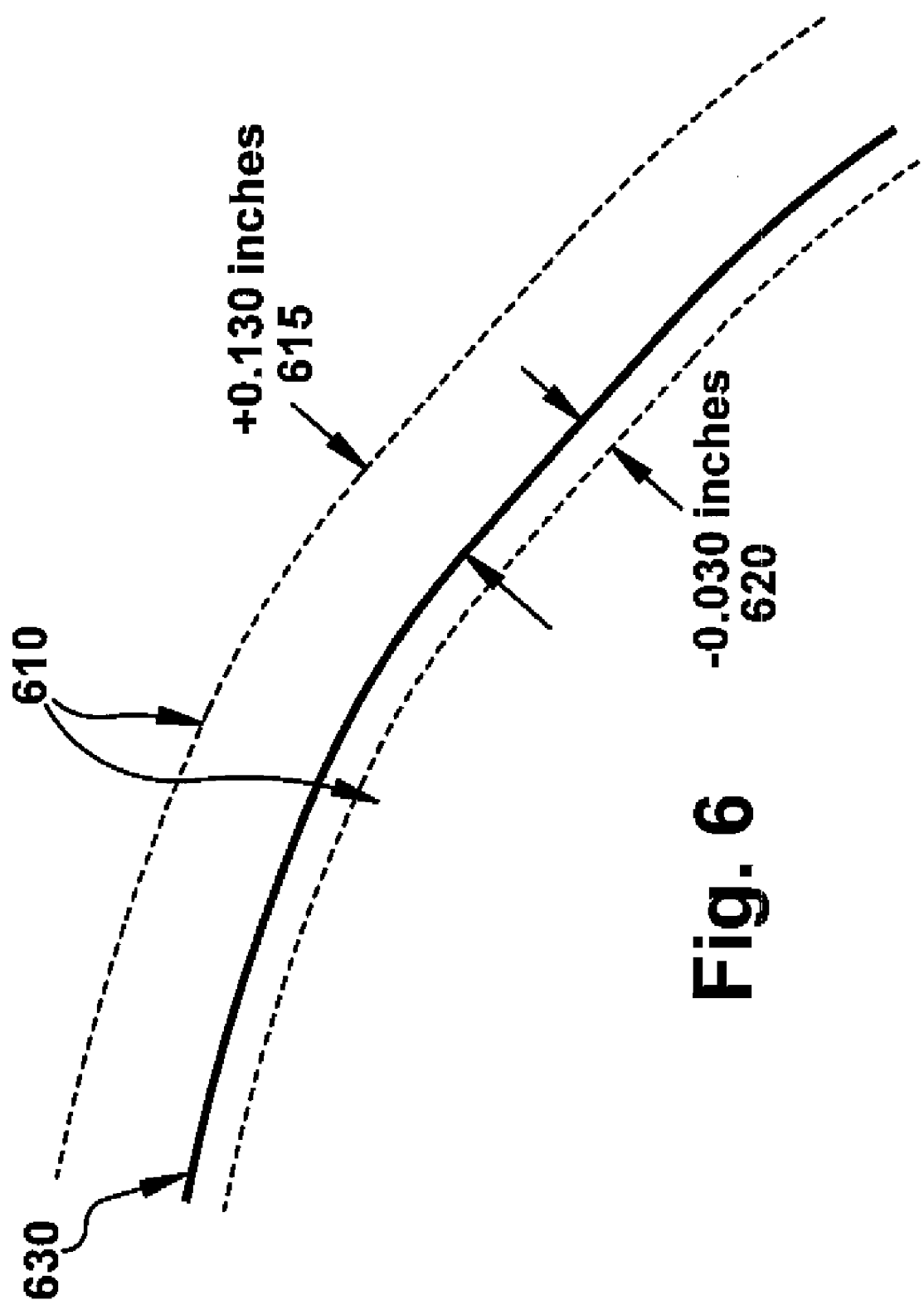

AIRFOIL SHAPE FOR A TURBINE NOZZLE

BACKGROUND OF THE INVENTION

The present invention relates to airfoils for a gas turbine and particularly relates to an airfoil profile for a first stage stator nozzle of a gas turbine.

In a gas turbine, many system requirements should be met at each stage of a gas turbine's flow path section to meet design goals. These design goals include, but are not limited to, overall improved efficiency and airfoil loading capability. For example, and in no way limiting of the invention, a nozzle of a turbine should achieve thermal and mechanical operating requirements for that particular stage.

Airfoil points have been patented as demonstrated by Barry et al. in U.S. Pat. No. 5,980,209. Barry et al. identified from 100-150 points per section with each section at a spacing of 0.52". The number of points defined may be dependent upon the rate of change of curvature of the section. In other words, for areas with higher curvature more points may be used to define that region.

BRIEF DESCRIPTION OF THE INVENTION

In accordance with one exemplary aspect of the present invention, there is provided an article of manufacture having a nominal profile substantially in accordance with Cartesian coordinate values of X, Y and Z set forth in TABLE I. X and Y are distances in inches which, when connected by smooth continuing arcs, define airfoil profile sections at each distance Z in inches. The profile sections at the Z distances may be joined smoothly with one another to form a complete airfoil shape.

In accordance with another exemplary aspect of the present invention, a turbine comprises a turbine stage. The turbine stage includes a plurality of articles of manufacture. Each of the articles of manufacture includes an airfoil having an airfoil shape. The airfoil comprises a nominal airfoil profile substantially in accordance with Cartesian coordinate values of X, Y and Z set forth in Table I. X and Y are distances in inches which, when connected by smooth continuing arcs, define airfoil profile sections at each distance Z in inches. The profiles at the Z distances are joined smoothly with one another to form a complete airfoil shape.

In accordance with a third aspect of the present invention, a turbine including a turbine stage having a plurality of articles of manufacture is provided. Each of the articles of manufacture may include an airfoil having a nominal airfoil profile substantially in accordance with Cartesian coordinate values of X, Y, and Z set forth in TABLE I. X and Y are distances in inches which, when connected by smooth continuing arcs, define airfoil profile sections at each distance Z in inches, the profile sections at the Z distances being joined smoothly with one another to form a complete airfoil shape. The X, Y and Z distances may be scalable as a function of the same constant or number to provide a scaled-up or scaled-down nozzle airfoil.

BRIEF DESCRIPTION OF THE DRAWINGS

FIG. 6 illustrates factors affecting variation of the nominal profile for an embodiment of the inventive airfoil.

DETAILED DESCRIPTION OF THE INVENTION

The embodiments of the present invention have many advantages, including defining airfoils for nozzles satisfying the restrictive thermal and mechanical operating requirements for that particular stage that a nozzle of a turbine should achieve.

According to one aspect of the present invention, a unique profile for an article of manufacture is provided. The article of manufacture may find application as an airfoil for the nozzles of a turbine stage, preferably the first stage nozzle of a gas turbine. The airfoil shape for the exemplary first stage nozzle of a gas turbine is established to optimize design factors including: 1) turbine work split; 2) airflow through the gas turbine; 3) aerodynamic efficiency; 4) mechanical life requirements and 5) impingement tube insertability. The airfoil shape can be defined by a loci of points in space that meet stage design requirements and can also be manufactured. These points are unique and specific to the system and are not obvious to those skilled in the art.

A gas turbine includes a plurality of turbine stages employing nozzles and nozzle airfoils. The turbine includes multiple stages. Each stage includes a nozzle arrangement in conjunction with a respective bucket associated with a stage of a rotor wheel. Each of the rotor wheels is connected to a shaft of the turbine, which in turn may be coupled with an electrical generator and a compressor. It will be appreciated, however, that turbines come in many different configurations of and numbers of stages, nozzle arrangements, and buckets.

Figure 1:
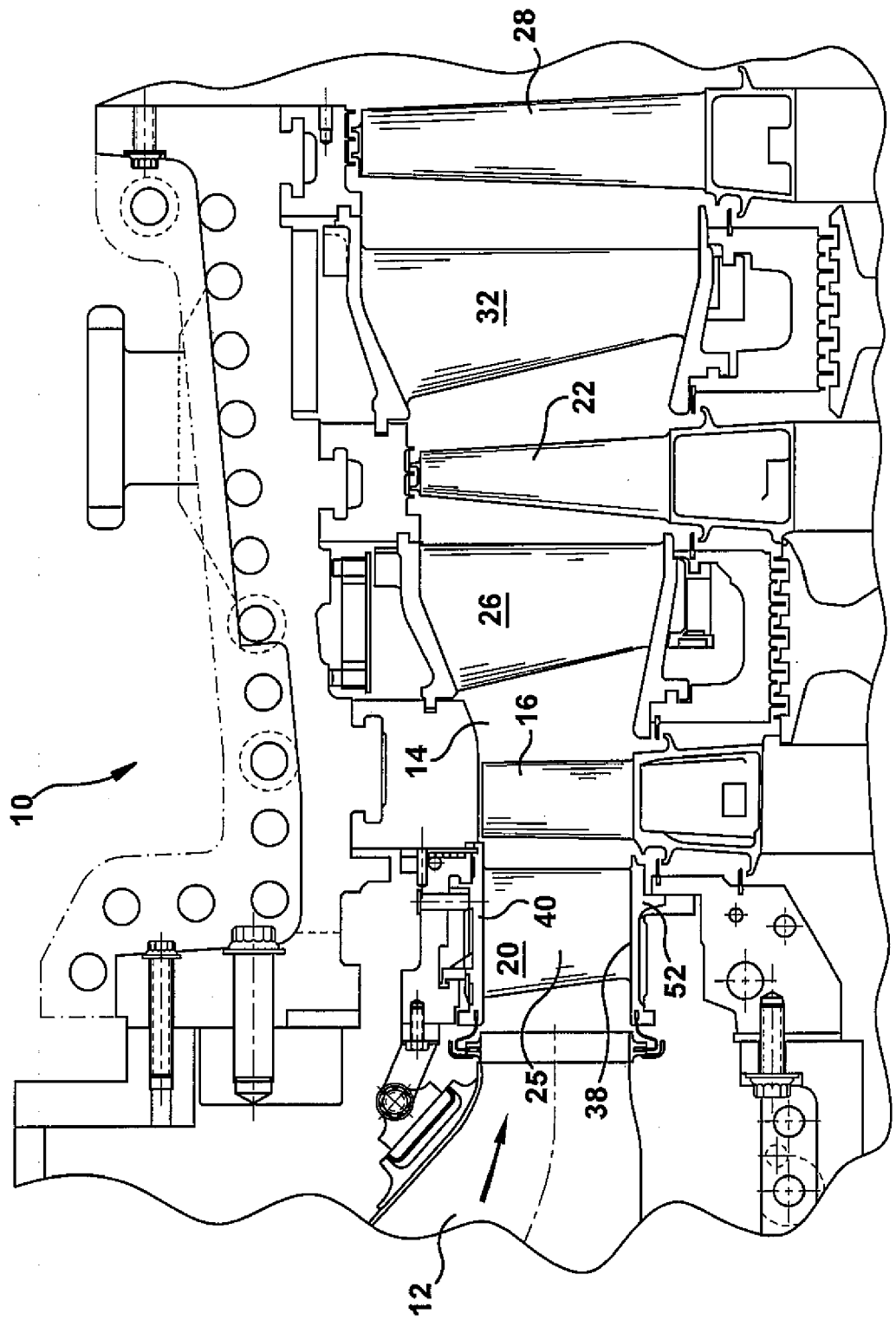
FIG. 1 schematically illustrates a turbine having a first stage turbine nozzle arrangement employing the nozzles and nozzle airfoils.

FIG. 1 schematically illustrates an axial turbine flow path 12 of a gas turbine 10 that includes a plurality of turbine stages employing nozzles and buckets. The direction of hot gas through the turbine flow path 12, as embodied by the invention, is indicated by arrow. For example, the gas turbine 10 may include a first stage with nozzle 20 and bucket 16, a second stage with nozzle 26 and bucket 22 and third stage with nozzle 32 and bucket 28. Each bucket is supported by a respective stage of the turbine wheel (not shown).

The first stage nozzle 20 includes an airfoil 25 and sidewalls 38, 40. The nozzle 20 includes an outer sidewall 40 and an inner sidewall wall 38. The sidewalls provide suitable mounting and support with surrounding turbine hardware.

The airfoil 25 has a profile including a 3-dimensional shape with suction and pressure sides, respectively, as well as a leading edge and trailing edge.

It will be appreciated that a plurality of the nozzles are spaced circumferentially, one from the other, about the first stage nozzle arrangement.

An important aspect of the present invention is the cold airfoil shape, which was optimized for performance and includes a three-dimensional (3D) trailing edge profile. The list of X, Y, and Z coordinates for the airfoil, which are included as TABLE I, meets gas turbine requirements for stage efficiency, nozzle throat area, turbine work split, impingement tube insertability and mechanical life. The points are arrived at by iteration between aerodynamic and mechanical design optimization. These are the only loci of points that allow the gas turbine to run in an efficient, safe and smooth manner.

The airfoil shape may be represented as a set of 1342 points from 11 sections of 122 points each. The X, Y & Z coordinates, which represent the airfoil shape, are created in a coordinate system which is defined relative to the cold engine centerline axis of the gas turbine (Y coordinate axis). The origin of the coordinate system on the cold engine centerline axis is defined as X=0.0, Y=0.0 and Z=0.0. The Z coordinate axis is defined as a radial line from the Y coordinate axis. The X coordinate axis is defined as being normal to the Y-Z plane. Airfoil sections are cut normal to the radial line (Z coordinate axis). The X & Y points, which make up the airfoil shape at each section, are in inches. The radial Z values in inches for the section planes extend from Z=46.628 farthest from the cold engine centerline axis to Z=40.628 inches, closest to the cold engine centerline axis.

The radial distance between each of the adjacent sections is 0.6 inches apart, such that the total radial distance from $Z_0$ to $Z_{10}$ is 6 inches. The bottom and top sections $Z_0$ and $Z_{10}$, respectively, may be obscured by fillets in the actual part casting where the airfoil meets the sidewalls. The remaining 9 sections are taken in a region of the airfoil where no fillets exist.

All of the 1342 points are taken from a nominal cold or room temperature for each cross-section of the nozzle. Each section is joined smoothly with the other sections to form the complete airfoil shape.

It will be appreciated that as each nozzle airfoil heats up in use, the profile will change as a result of stress and temperature. Thus, the cold or room temperature profile is given by the X, Y and Z coordinates for manufacturing purposes. Since the manufactured nozzle airfoil profile may be different from the nominal airfoil profile given by the following table, a distance of plus 0.130 inch to minus 0.030 inch from the nominal profile in a direction normal to any airfoil surface location defines the profile envelope for this nozzle airfoil. The design is robust to this variation without impairment of the mechanical and aerodynamic functions.

It will also be appreciated that the airfoil can be scaled up or scaled down geometrically for introduction into similar turbine designs, with smaller or larger frame size. Consequently, the X, Y, and Z coordinates in inches of the nominal airfoil profile given below are a function of the same constant or number. That is, the X, Y and the Z coordinate values in inches may be multiplied or divided by the same constant or number to provide a scaled up or scaled down version of the nozzle airfoil profile while retaining the airfoil section shape and unique properties.

Figure 2:
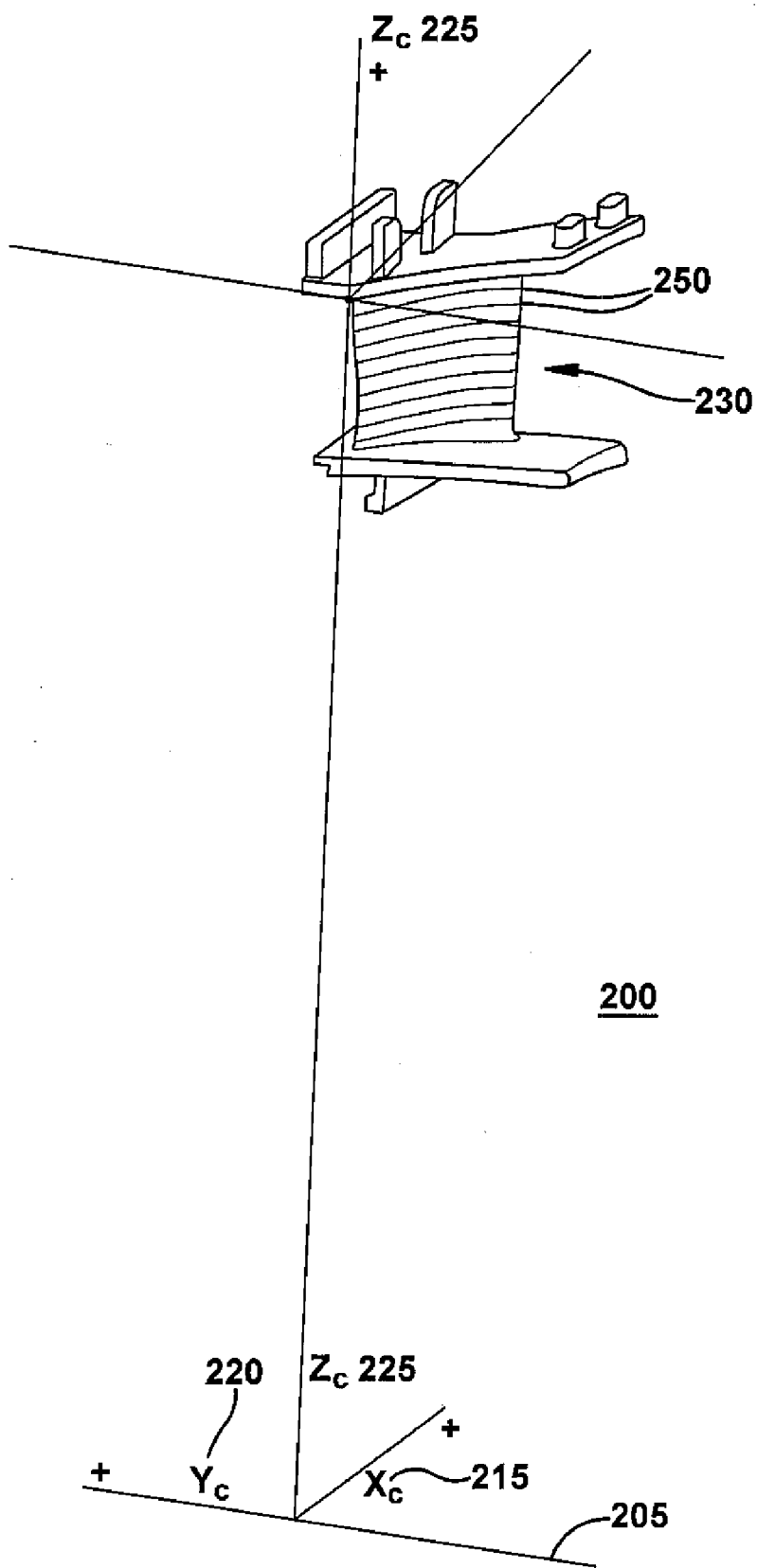
FIG. 2 illustrates a coordinate system for the article of manufacture employed as an embodiment of the inventive airfoil for a stage in a gas turbine.
Figure 3:
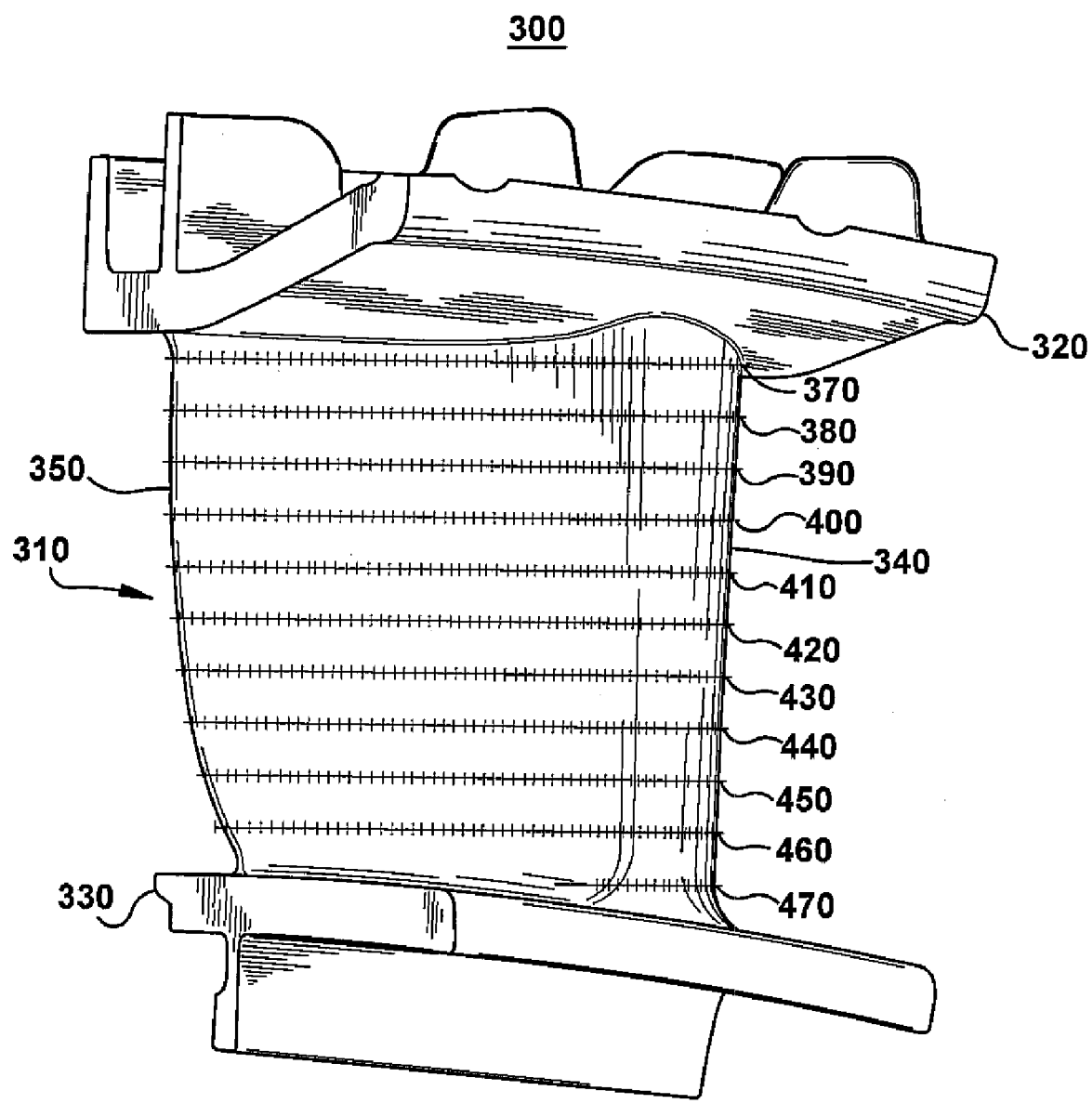
FIG. 3 illustrates a forward view including the trailing edge of an embodiment of the inventive airfoil.
Figure 4:
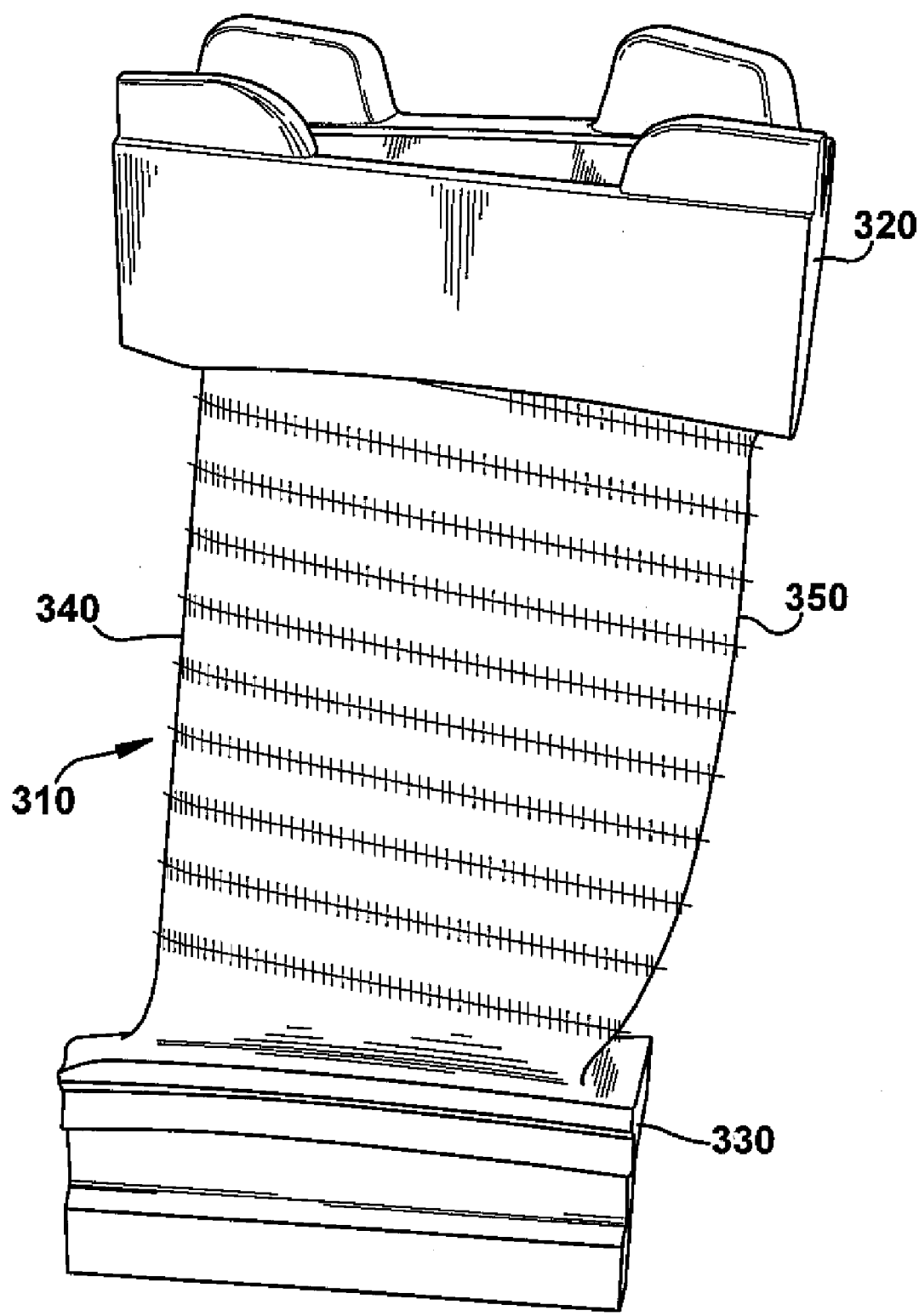
FIG. 4 illustrates an aft view of an embodiment of the present invention.

Referring now to FIGS. 2, 3, and 4, there is illustrated an airfoil for a first stage turbine nozzle constructed in accordance with one aspect of the present invention including an airfoil mounted between an inner and an outer sidewall. Fillets are not included in point definition.

FIG. 2 illustrates a coordinate system for the article of manufacture employed as an embodiment of the inventive airfoil for a stage in a gas turbine. The coordinate system 200 is defined relative to the cold engine centerline axis 205 of the gas turbine. The coordinate system includes X, Y and Z coordinates $X_C$ 215, $Y_C$ 220 and $Z_C$ 225. The origin of the XYZ coordinate system (X=0, Y=0, Z=0) is centered on the cold engine centerline axis 205. $Y_C$ 220 is coincident with the cold engine centerline axis 205. $Z_C$ 225 is directed along a radial line normal to the cold engine centerline axis 205. The positive radial direction of $Z_C$ 225 is defined as toward the airfoil 230. $X_C$ 215 is defined as being normal to the plane formed by $Y_C$ 220 and $Z_C$ 225. The positive direction of $X_C$ 215 and $Y_C$ 220 are identified by the label placement.

The nozzle includes an airfoil with a trailing edge, a leading edge, an outer sidewall and an inner sidewall. FIG. 3 illustrates a forward view including the trailing edge of an embodiment of the inventive airfoil. The nozzle 300 may include the airfoil 310, an outer sidewall 320 and an inner sidewall 330 and a leading edge 340. The trailing edge 350 of the airfoil 310 is optimized, according to the coordinate points provided in TABLE I, to provide improved aerodynamic stage efficiency. Sections $Z_0$ to $Z_{10}$ are designated 470, 460, 450, 440, 430, 420, 410, 400, 390, 380, and 370, respectively.

Referring again to FIG. 2, airfoil sections 250 are cut normal to $Z_C$ 225 (radial line passing from the cold engine centerline axis 205). The X and Y points, which make up the airfoil shape at each section, are in inches. The radial Z values for the section planes extend from $Z_0$ (470)=40.628 closest to the cold engine centerline axis to $Z_{10}$ (370)=46.628 inch, farthest from the cold engine centerline axis. The engine centerline is located at Z=0 inch. The points defining the nozzle sections are specified in TABLE I.

FIG. 4 illustrates an aft view of an embodiment of the inventive airfoil, including the outer sidewall 320, the inner sidewall 330, the leading edge 340, and the trailing edge 350 for the airfoil 310 are identified.

Figure 5:
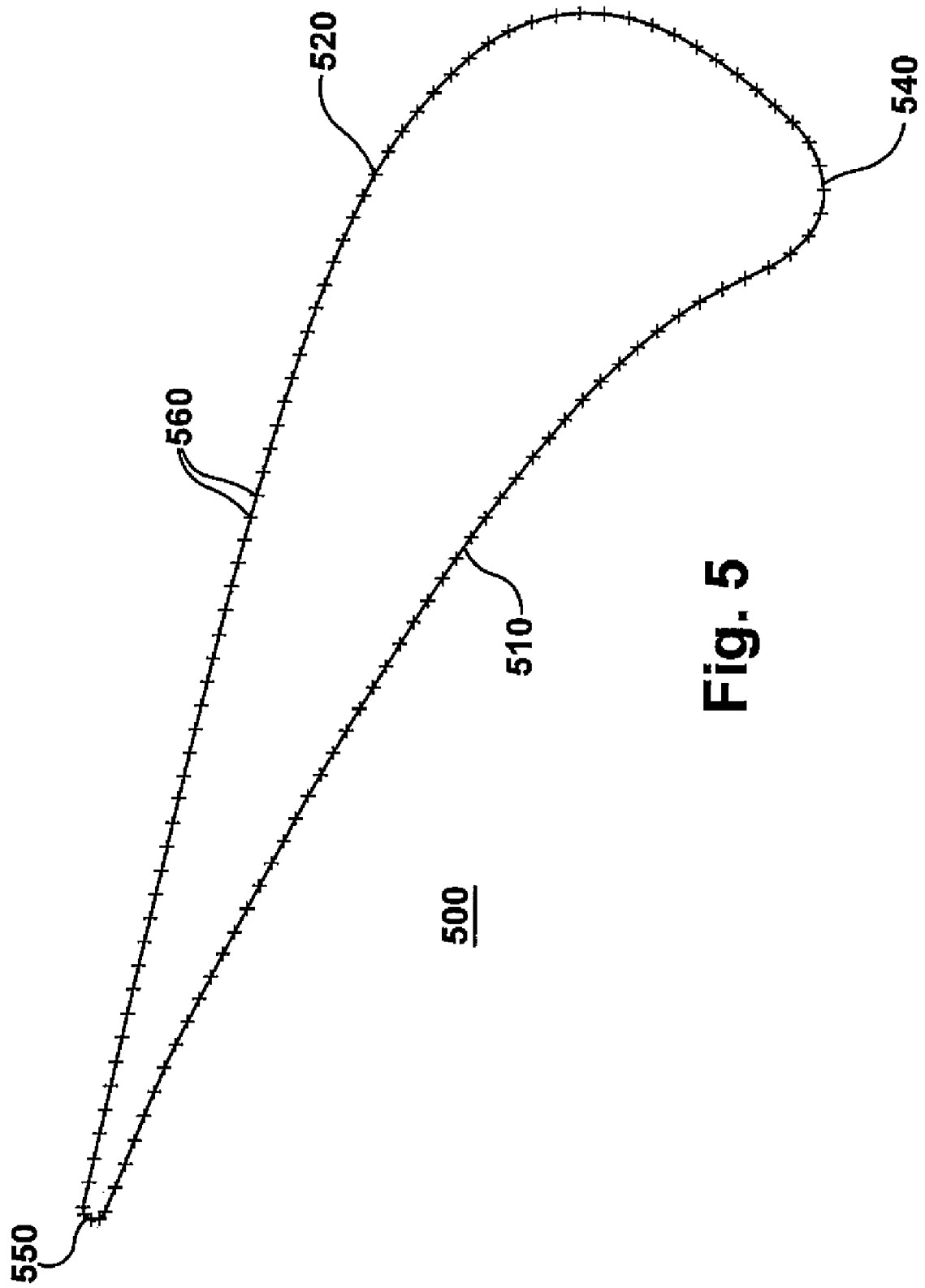
FIG. 5 illustrates a typical section through an embodiment of the inventive airfoil including exemplary section points at section $Z_1$.

FIG. 5 illustrates a typical section through an embodiment of the inventive airfoil including exemplary section points at $Z_1$=41.228. A typical section 500 through the airfoil may include a pressure side 510, a suction side 520, a leading edge 540, and a trailing edge 550. FIG. 5 illustrates the typical distribution of coordinate points 560 taken from TABLE I for a section. The coordinate points 560 are defined such that the trailing edge 550 includes a greater concentration of points representing the greater curvature for this surface, thereby capturing the true intent and criticality of the airfoil shape for operation.

FIG. 6 illustrates factors affecting variation of the nominal profile for an embodiment of the inventive airfoil. A profile is the range of the variation between measured points on an airfoil surface and their ideal position. The TABLE I values are generated and shown for determining the profile of the airfoil. There are typical manufacturing tolerances, as well as coatings, which must be accounted for in the actual profile of the airfoil. Accordingly, the values for the profile given in TABLE I are for a nominal airfoil. It will therefore be appreciated that ±typical manufacturing tolerances, i.e. ±values, are additive to the X and Y values given in TABLE I below. Two components characterize the changes, namely, the mean and the standard deviation for each process. In consideration of process capability data a tolerance 610 of 0.160 inches overlapping the nominal profile 630 is appropriate for this design. This means that there is a +0.130 inch tolerance 615 and a −0.030 inch tolerance 620 around the nominal profile 630. The design is robust to this variation meaning that mechanical and aerodynamic function is not impaired. Accordingly, a distance of +0.130 inch/−0.030 inch in a direction normal to any surface location along the airfoil profile defines an airfoil profile envelope for this particular nozzle airfoil design and turbine.

TABLE I

The coordinate values given below provide the preferred nominal profile envelope information regarding the XYZ coordinates that are optimized for the 1st stage nozzle.

| X | Y | Z |
|---|---|---|
| 1.252 | −0.100 | 40.628 |
| 1.300 | 0.081 | 40.628 |
| 1.357 | −0.158 | 40.628 |
| 1.407 | 0.040 | 40.628 |
| 1.567 | −0.277 | 40.628 |
| 1.462 | −0.217 | 40.628 |
| 1.131 | 0.118 | 40.628 |
| 1.513 | 0.000 | 40.628 |
| 1.097 | 0.067 | 40.628 |
| 1.193 | 0.121 | 40.628 |
| 1.146 | −0.041 | 40.628 |
| 1.104 | 0.005 | 40.628 |
| 1.620 | −0.041 | 40.628 |
| 2.047 | −0.205 | 40.628 |
| 3.003 | −0.583 | 40.628 |
| 2.781 | −1.061 | 40.628 |
| 2.472 | −0.372 | 40.628 |
| 2.684 | −0.989 | 40.628 |
| 1.940 | −0.164 | 40.628 |
| 2.897 | −0.541 | 40.628 |
| 2.366 | −0.330 | 40.628 |
| 2.487 | −0.850 | 40.628 |
| 1.834 | −0.123 | 40.628 |
| 2.388 | −0.782 | 40.628 |
| 2.791 | −0.498 | 40.628 |
| 2.287 | −0.715 | 40.628 |
| 2.260 | −0.288 | 40.628 |
| 1.775 | −0.398 | 40.628 |
| 3.247 | −1.442 | 40.628 |
| 3.156 | −1.363 | 40.628 |
| 1.727 | −0.082 | 40.628 |
| 1.671 | −0.337 | 40.628 |
| 3.064 | −1.285 | 40.628 |
| 2.186 | −0.650 | 40.628 |
| 2.685 | −0.456 | 40.628 |
| 2.971 | −1.209 | 40.628 |
| 3.215 | −0.669 | 40.628 |
| 2.877 | −1.134 | 40.628 |
| 2.084 | −0.585 | 40.628 |
| 2.153 | −0.246 | 40.628 |
| 3.109 | −0.626 | 40.628 |
| 2.586 | −0.919 | 40.628 |
| 1.982 | −0.522 | 40.628 |
| 2.578 | −0.414 | 40.628 |
| 1.879 | −0.459 | 40.628 |
| 3.532 | −0.799 | 40.628 |
| 4.321 | −2.736 | 40.628 |
| 3.981 | −2.238 | 40.628 |
| 4.190 | −2.533 | 40.628 |
| 3.848 | −0.931 | 40.628 |
| 4.476 | −1.206 | 40.628 |
| 4.814 | −3.564 | 40.628 |
| 3.832 | −2.049 | 40.628 |
| 4.507 | −3.046 | 40.628 |
| 3.674 | −1.867 | 40.628 |
| 4.580 | −1.254 | 40.628 |
| 3.593 | −1.778 | 40.628 |
| 4.372 | −1.159 | 40.628 |
| 3.908 | −2.143 | 40.628 |
| 4.384 | −2.839 | 40.628 |
| 3.754 | −1.957 | 40.628 |
| 3.953 | −0.976 | 40.628 |
| 4.446 | −2.942 | 40.628 |
| 3.336 | −1.524 | 40.628 |
| 4.256 | −2.634 | 40.628 |
| 4.268 | −1.112 | 40.628 |
| 4.123 | −2.433 | 40.628 |
| 4.785 | −1.353 | 40.628 |
| 3.743 | −0.887 | 40.628 |
| 4.683 | −1.303 | 40.628 |
| 4.751 | −3.461 | 40.628 |
| 3.321 | −0.712 | 40.628 |
| 4.163 | −1.066 | 40.628 |
| 4.629 | −3.254 | 40.628 |
| 4.690 | −3.358 | 40.628 |
| 3.637 | −0.842 | 40.628 |
| 4.053 | −2.335 | 40.628 |
| 4.058 | −1.021 | 40.628 |
| 4.568 | −3.150 | 40.628 |
| 3.509 | −1.692 | 40.628 |
| 3.423 | −1.607 | 40.628 |
| 3.426 | −0.755 | 40.628 |
| 4.989 | −1.457 | 40.628 |
| 5.707 | −4.006 | 40.628 |
| 6.128 | −3.469 | 40.628 |
| 5.838 | −2.032 | 40.628 |
| 5.790 | −3.927 | 40.628 |
| 6.283 | −2.925 | 40.628 |
| 5.866 | −3.842 | 40.628 |
| 4.887 | −1.405 | 40.628 |
| 6.183 | −2.483 | 40.628 |
| 4.878 | −3.666 | 40.628 |
| 6.278 | −2.811 | 40.628 |
| 5.288 | −1.625 | 40.628 |
| 5.171 | −4.046 | 40.628 |
| 6.065 | −2.287 | 40.628 |
| 5.083 | −3.964 | 40.628 |
| 5.995 | −2.197 | 40.628 |
| 6.129 | −2.383 | 40.628 |
| 5.664 | −1.883 | 40.628 |
| 5.013 | −3.866 | 40.628 |
| 5.919 | −2.112 | 40.628 |
| 6.259 | −2.698 | 40.628 |
| 5.189 | −1.567 | 40.628 |
| 6.179 | −3.366 | 40.628 |
| 4.945 | −3.767 | 40.628 |
| 6.007 | −3.662 | 40.628 |
| 5.391 | −4.119 | 40.628 |
| 6.254 | −3.151 | 40.628 |
| 5.753 | −1.956 | 40.628 |
| 6.275 | −3.039 | 40.628 |
| 5.938 | −3.754 | 40.628 |
| 5.504 | −4.107 | 40.628 |
| 6.227 | −2.588 | 40.628 |
| 5.090 | −1.511 | 40.628 |
| 6.221 | −3.260 | 40.628 |
| 5.385 | −1.685 | 40.628 |
| 5.573 | −1.814 | 40.628 |
| 6.070 | −3.567 | 40.628 |
| 5.279 | −4.100 | 40.628 |
| 5.611 | −4.067 | 40.628 |
| 5.480 | −1.748 | 40.628 |
| 1.540 | −0.382 | 41.228 |
| 1.049 | −0.437 | 41.228 |
| 0.710 | −0.282 | 41.228 |
| 0.970 | −0.215 | 41.228 |
| 0.673 | −0.247 | 41.228 |
| 1.426 | −0.348 | 41.228 |
| 1.603 | −0.717 | 41.228 |
| 1.383 | −0.602 | 41.228 |
| 1.272 | −0.546 | 41.228 |
| 0.856 | −0.183 | 41.228 |
| 0.692 | −0.156 | 41.228 |
| 0.665 | −0.197 | 41.228 |
| 1.312 | −0.315 | 41.228 |
| 1.084 | −0.248 | 41.228 |
| 0.742 | −0.150 | 41.228 |
| 0.936 | −0.384 | 41.228 |
| 1.198 | −0.282 | 41.228 |
| 0.823 | −0.333 | 41.228 |
| 1.493 | −0.659 | 41.228 |
| 1.160 | −0.491 | 41.228 |
| 3.239 | −0.911 | 41.228 |
| 2.874 | −1.492 | 41.228 |
| 2.108 | −0.554 | 41.228 |
| 2.772 | −1.422 | 41.228 |

TABLE I-continued

The coordinate values given below provide the preferred nominal profile envelope information regarding the XYZ coordinates that are optimized for the 1st stage nozzle.

| X | Y | Z |
|---|---|---|
| 2.669 | −1.352 | 41.228 |
| 2.565 | −1.284 | 41.228 |
| 2.448 | −0.659 | 41.228 |
| 2.461 | −1.216 | 41.228 |
| 3.075 | −1.638 | 41.228 |
| 1.994 | −0.519 | 41.228 |
| 2.561 | −0.694 | 41.228 |
| 2.356 | −1.150 | 41.228 |
| 2.221 | −0.588 | 41.228 |
| 3.013 | −0.838 | 41.228 |
| 2.250 | −1.086 | 41.228 |
| 2.975 | −1.564 | 41.228 |
| 2.144 | −1.022 | 41.228 |
| 2.036 | −0.959 | 41.228 |
| 2.900 | −0.802 | 41.228 |
| 2.674 | −0.730 | 41.228 |
| 1.929 | −0.897 | 41.228 |
| 2.334 | −0.623 | 41.228 |
| 2.787 | −0.765 | 41.228 |
| 1.821 | −0.836 | 41.228 |
| 1.767 | −0.450 | 41.228 |
| 1.881 | −0.484 | 41.228 |
| 3.174 | −1.713 | 41.228 |
| 1.712 | −0.776 | 41.228 |
| 3.126 | −0.874 | 41.228 |
| 1.653 | −0.416 | 41.228 |
| 4.137 | −1.218 | 41.228 |
| 4.249 | −1.258 | 41.228 |
| 3.834 | −2.278 | 41.228 |
| 3.914 | −1.138 | 41.228 |
| 4.762 | −3.438 | 41.228 |
| 4.471 | −1.342 | 41.228 |
| 3.559 | −2.026 | 41.228 |
| 4.627 | −3.230 | 41.228 |
| 3.744 | −2.192 | 41.228 |
| 4.557 | −3.127 | 41.228 |
| 3.652 | −2.108 | 41.228 |
| 4.695 | −3.334 | 41.228 |
| 3.689 | −1.061 | 41.228 |
| 4.026 | −1.178 | 41.228 |
| 3.577 | −1.023 | 41.228 |
| 3.465 | −1.945 | 41.228 |
| 4.411 | −2.926 | 41.228 |
| 3.464 | −0.985 | 41.228 |
| 4.800 | −1.477 | 41.228 |
| 4.335 | −2.828 | 41.228 |
| 4.828 | −3.543 | 41.228 |
| 4.691 | −1.431 | 41.228 |
| 4.257 | −2.732 | 41.228 |
| 3.272 | −1.789 | 41.228 |
| 4.360 | −1.300 | 41.228 |
| 3.352 | −0.948 | 41.228 |
| 4.093 | −2.545 | 41.228 |
| 4.581 | −1.386 | 41.228 |
| 3.922 | −2.365 | 41.228 |
| 3.369 | −1.866 | 41.228 |
| 3.802 | −1.099 | 41.228 |
| 4.176 | −2.638 | 41.228 |
| 4.009 | −2.454 | 41.228 |
| 4.485 | −3.026 | 41.228 |
| 5.299 | −4.100 | 41.228 |
| 5.099 | −3.959 | 41.228 |
| 5.438 | −1.793 | 41.228 |
| 5.416 | −4.119 | 41.228 |
| 6.220 | −3.322 | 41.228 |
| 6.301 | −2.977 | 41.228 |
| 5.189 | −4.045 | 41.228 |
| 6.299 | −2.858 | 41.228 |
| 5.643 | −4.060 | 41.228 |
| 6.287 | −3.095 | 41.228 |
| 5.335 | −1.734 | 41.228 |
| 6.282 | −2.741 | 41.228 |
| 6.170 | −3.429 | 41.228 |
| 5.741 | −3.993 | 41.228 |
| 5.028 | −3.857 | 41.228 |
| 5.539 | −1.855 | 41.228 |
| 6.250 | −2.627 | 41.228 |
| 5.826 | −3.910 | 41.228 |
| 4.961 | −3.753 | 41.228 |
| 6.259 | −3.210 | 41.228 |
| 5.533 | −4.104 | 41.228 |
| 5.124 | −1.624 | 41.228 |
| 6.203 | −2.518 | 41.228 |
| 5.904 | −3.821 | 41.228 |
| 5.017 | −1.573 | 41.228 |
| 5.978 | −3.728 | 41.228 |
| 4.909 | −1.524 | 41.228 |
| 6.113 | −3.533 | 41.228 |
| 6.075 | −2.318 | 41.228 |
| 6.144 | −2.415 | 41.228 |
| 4.894 | −3.648 | 41.228 |
| 5.998 | −2.228 | 41.228 |
| 6.048 | −3.633 | 41.228 |
| 5.733 | −1.991 | 41.228 |
| 5.637 | −1.921 | 41.228 |
| 5.915 | −2.144 | 41.228 |
| 5.230 | −1.678 | 41.228 |
| 5.826 | −2.065 | 41.228 |
| 0.437 | −0.397 | 41.828 |
| 1.093 | −0.454 | 41.828 |
| 1.620 | −0.956 | 41.828 |
| 1.563 | −0.574 | 41.828 |
| 1.167 | −0.731 | 41.828 |
| 1.052 | −0.678 | 41.828 |
| 1.446 | −0.544 | 41.828 |
| 0.589 | −0.476 | 41.828 |
| 0.472 | −0.429 | 41.828 |
| 0.937 | −0.626 | 41.828 |
| 0.976 | −0.424 | 41.828 |
| 1.328 | −0.514 | 41.828 |
| 1.281 | −0.786 | 41.828 |
| 1.211 | −0.484 | 41.828 |
| 1.507 | −0.898 | 41.828 |
| 0.858 | −0.395 | 41.828 |
| 1.394 | −0.842 | 41.828 |
| 0.741 | −0.366 | 41.828 |
| 0.705 | −0.525 | 41.828 |
| 0.459 | −0.314 | 41.828 |
| 0.505 | −0.307 | 41.828 |
| 0.822 | −0.575 | 41.828 |
| 0.431 | −0.351 | 41.828 |
| 0.623 | −0.336 | 41.828 |
| 2.609 | −1.517 | 41.828 |
| 2.501 | −1.451 | 41.828 |
| 1.797 | −0.635 | 41.828 |
| 3.200 | −1.020 | 41.828 |
| 2.616 | −0.856 | 41.828 |
| 1.680 | −0.605 | 41.828 |
| 2.733 | −0.888 | 41.828 |
| 3.083 | −0.987 | 41.828 |
| 2.850 | −0.921 | 41.828 |
| 2.967 | −0.953 | 41.828 |
| 2.383 | −0.792 | 41.828 |
| 3.032 | −1.793 | 41.828 |
| 1.732 | −1.014 | 41.828 |
| 2.927 | −1.723 | 41.828 |
| 2.500 | −0.823 | 41.828 |
| 2.822 | −1.653 | 41.828 |
| 2.284 | −1.322 | 41.828 |
| 2.393 | −1.386 | 41.828 |
| 2.175 | −1.258 | 41.828 |
| 2.065 | −1.196 | 41.828 |
| 2.716 | −1.585 | 41.828 |
| 2.266 | −0.760 | 41.828 |
| 2.149 | −0.728 | 41.828 |
| 1.954 | −1.134 | 41.828 |

TABLE I-continued

The coordinate values given below provide the preferred nominal profile envelope information regarding the XYZ coordinates that are optimized for the 1st stage nozzle.

| X | Y | Z |
|---|---|---|
| 3.239 | −1.938 | 41.828 |
| 2.032 | −0.697 | 41.828 |
| 3.136 | −1.865 | 41.828 |
| 1.843 | −1.074 | 41.828 |
| 1.915 | −0.666 | 41.828 |
| 6.080 | −3.615 | 41.828 |
| 4.699 | −1.502 | 41.828 |
| 4.027 | −2.572 | 41.828 |
| 4.296 | −2.838 | 41.828 |
| 4.208 | −2.747 | 41.828 |
| 5.873 | −2.121 | 41.828 |
| 3.741 | −2.322 | 41.828 |
| 3.643 | −2.242 | 41.828 |
| 3.544 | −2.164 | 41.828 |
| 4.912 | −3.639 | 41.828 |
| 4.471 | −1.420 | 41.828 |
| 3.933 | −2.487 | 41.828 |
| 4.843 | −3.533 | 41.828 |
| 4.545 | −3.124 | 41.828 |
| 4.382 | −2.931 | 41.828 |
| 4.812 | −1.546 | 41.828 |
| 6.253 | −3.296 | 41.828 |
| 3.838 | −2.404 | 41.828 |
| 5.964 | −2.201 | 41.828 |
| 5.256 | −1.739 | 41.828 |
| 5.046 | −3.852 | 41.828 |
| 6.204 | −3.406 | 41.828 |
| 6.291 | −3.181 | 41.828 |
| 5.319 | −4.101 | 41.828 |
| 6.009 | −3.713 | 41.828 |
| 5.439 | −4.119 | 41.828 |
| 4.465 | −3.027 | 41.828 |
| 5.933 | −3.807 | 41.828 |
| 5.576 | −1.912 | 41.828 |
| 5.471 | −1.851 | 41.828 |
| 6.324 | −2.941 | 41.828 |
| 5.854 | −3.899 | 41.828 |
| 5.558 | −4.102 | 41.828 |
| 6.146 | −3.513 | 41.828 |
| 5.365 | −1.794 | 41.828 |
| 5.768 | −3.984 | 41.828 |
| 6.316 | −2.821 | 41.828 |
| 4.699 | −3.325 | 41.828 |
| 5.777 | −2.047 | 41.828 |
| 5.670 | −4.055 | 41.828 |
| 3.896 | −1.229 | 41.828 |
| 6.291 | −2.702 | 41.828 |
| 5.207 | −4.045 | 41.828 |
| 4.623 | −3.223 | 41.828 |
| 3.780 | −1.193 | 41.828 |
| 5.147 | −1.687 | 41.828 |
| 6.049 | −2.288 | 41.828 |
| 6.251 | −2.588 | 41.828 |
| 6.316 | −3.062 | 41.828 |
| 3.443 | −2.088 | 41.828 |
| 3.664 | −1.158 | 41.828 |
| 5.036 | −1.638 | 41.828 |
| 4.242 | −1.341 | 41.828 |
| 4.979 | −3.745 | 41.828 |
| 4.772 | −3.428 | 41.828 |
| 6.195 | −2.481 | 41.828 |
| 5.678 | −1.977 | 41.828 |
| 3.342 | −2.012 | 41.828 |
| 3.548 | −1.123 | 41.828 |
| 4.127 | −1.303 | 41.828 |
| 4.924 | −1.591 | 41.828 |
| 4.118 | −2.659 | 41.828 |
| 4.357 | −1.380 | 41.828 |
| 6.127 | −2.380 | 41.828 |
| 3.432 | −1.088 | 41.828 |
| 4.012 | −1.265 | 41.828 |
| 4.585 | −1.460 | 41.828 |
| 3.316 | −1.054 | 41.828 |
| 5.116 | −3.958 | 41.828 |
| 0.702 | −0.478 | 42.428 |
| 0.582 | −0.451 | 42.428 |
| 0.668 | −0.654 | 42.428 |
| 0.297 | −0.403 | 42.428 |
| 0.461 | −0.424 | 42.428 |
| 0.549 | −0.605 | 42.428 |
| 1.303 | −0.616 | 42.428 |
| 0.271 | −0.439 | 42.428 |
| 1.486 | −1.026 | 42.428 |
| 1.371 | −0.970 | 42.428 |
| 0.341 | −0.397 | 42.428 |
| 1.424 | −0.644 | 42.428 |
| 0.276 | −0.483 | 42.428 |
| 1.022 | −0.806 | 42.428 |
| 1.544 | −0.672 | 42.428 |
| 0.904 | −0.754 | 42.428 |
| 0.786 | −0.703 | 42.428 |
| 0.822 | −0.505 | 42.428 |
| 1.183 | −0.588 | 42.428 |
| 1.601 | −1.084 | 42.428 |
| 1.138 | −0.860 | 42.428 |
| 1.063 | −0.560 | 42.428 |
| 0.943 | −0.533 | 42.428 |
| 0.430 | −0.558 | 42.428 |
| 1.255 | −0.914 | 42.428 |
| 0.310 | −0.512 | 42.428 |
| 3.156 | −1.983 | 42.428 |
| 2.024 | −0.787 | 42.428 |
| 2.612 | −1.642 | 42.428 |
| 3.048 | −1.913 | 42.428 |
| 1.904 | −0.758 | 42.428 |
| 2.391 | −1.512 | 42.428 |
| 1.784 | −0.729 | 42.428 |
| 3.220 | −1.089 | 42.428 |
| 2.623 | −0.935 | 42.428 |
| 2.502 | −1.576 | 42.428 |
| 1.664 | −0.701 | 42.428 |
| 2.279 | −1.448 | 42.428 |
| 2.055 | −1.323 | 42.428 |
| 2.722 | −1.708 | 42.428 |
| 1.942 | −1.262 | 42.428 |
| 2.144 | −0.816 | 42.428 |
| 3.101 | −1.057 | 42.428 |
| 1.715 | −1.142 | 42.428 |
| 1.829 | −1.202 | 42.428 |
| 2.742 | −0.965 | 42.428 |
| 2.503 | −0.905 | 42.428 |
| 2.940 | −1.844 | 42.428 |
| 2.167 | −1.385 | 42.428 |
| 2.383 | −0.875 | 42.428 |
| 2.831 | −1.775 | 42.428 |
| 2.862 | −0.995 | 42.428 |
| 2.981 | −1.026 | 42.428 |
| 2.264 | −0.846 | 42.428 |
| 4.641 | −1.505 | 42.428 |
| 4.524 | −1.466 | 42.428 |
| 3.474 | −2.200 | 42.428 |
| 3.578 | −1.185 | 42.428 |
| 3.459 | −1.152 | 42.428 |
| 4.457 | −3.023 | 42.428 |
| 3.340 | −1.120 | 42.428 |
| 4.275 | −2.842 | 42.428 |
| 4.786 | −3.417 | 42.428 |
| 4.367 | −2.931 | 42.428 |
| 3.579 | −2.274 | 42.428 |
| 4.406 | −1.428 | 42.428 |
| 4.289 | −1.391 | 42.428 |
| 4.180 | −2.755 | 42.428 |
| 4.709 | −3.314 | 42.428 |
| 3.369 | −2.126 | 42.428 |
| 4.628 | −3.215 | 42.428 |
| 4.084 | −2.670 | 42.428 |

TABLE I-continued

The coordinate values given below provide the preferred nominal profile envelope information regarding the XYZ coordinates that are optimized for the 1st stage nozzle.

| X | Y | Z |
|---|---|---|
| 4.171 | −1.355 | 42.428 |
| 4.544 | −3.117 | 42.428 |
| 3.986 | −2.588 | 42.428 |
| 4.757 | −1.546 | 42.428 |
| 4.053 | −1.319 | 42.428 |
| 3.682 | −2.350 | 42.428 |
| 3.263 | −2.054 | 42.428 |
| 3.785 | −2.428 | 42.428 |
| 3.934 | −1.285 | 42.428 |
| 3.886 | −2.507 | 42.428 |
| 3.815 | −1.251 | 42.428 |
| 3.697 | −1.218 | 42.428 |
| 5.103 | −1.678 | 42.428 |
| 5.134 | −3.956 | 42.428 |
| 4.989 | −1.632 | 42.428 |
| 5.953 | −2.172 | 42.428 |
| 5.583 | −4.100 | 42.428 |
| 6.111 | −3.599 | 42.428 |
| 5.225 | −4.045 | 42.428 |
| 5.462 | −4.119 | 42.428 |
| 5.795 | −3.977 | 42.428 |
| 6.177 | −3.495 | 42.428 |
| 5.858 | −2.094 | 42.428 |
| 5.882 | −3.889 | 42.428 |
| 6.200 | −2.446 | 42.428 |
| 4.930 | −3.629 | 42.428 |
| 4.860 | −3.522 | 42.428 |
| 6.261 | −2.554 | 42.428 |
| 5.758 | −2.022 | 42.428 |
| 6.283 | −3.272 | 42.428 |
| 6.307 | −2.668 | 42.428 |
| 5.695 | −4.050 | 42.428 |
| 5.654 | −1.955 | 42.428 |
| 6.320 | −3.155 | 42.428 |
| 5.340 | −4.102 | 42.428 |
| 6.349 | −2.910 | 42.428 |
| 5.547 | −1.892 | 42.428 |
| 6.343 | −3.033 | 42.428 |
| 5.439 | −1.834 | 42.428 |
| 4.873 | −1.588 | 42.428 |
| 6.126 | −2.347 | 42.428 |
| 6.039 | −3.699 | 42.428 |
| 5.328 | −1.779 | 42.428 |
| 6.235 | −3.386 | 42.428 |
| 5.962 | −3.796 | 42.428 |
| 6.043 | −2.256 | 42.428 |
| 6.336 | −2.788 | 42.428 |
| 4.998 | −3.738 | 42.428 |
| 5.216 | −1.727 | 42.428 |
| 5.064 | −3.848 | 42.428 |
| 1.586 | −0.708 | 43.028 |
| 0.572 | −0.669 | 43.028 |
| 0.974 | −0.573 | 43.028 |
| 1.341 | −0.653 | 43.028 |
| 0.451 | −0.621 | 43.028 |
| 1.463 | −0.680 | 43.028 |
| 0.851 | −0.546 | 43.028 |
| 0.329 | −0.574 | 43.028 |
| 0.729 | −0.519 | 43.028 |
| 0.174 | −0.500 | 43.028 |
| 0.606 | −0.493 | 43.028 |
| 0.195 | −0.421 | 43.028 |
| 0.484 | −0.466 | 43.028 |
| 1.522 | −1.098 | 43.028 |
| 1.405 | −1.040 | 43.028 |
| 0.361 | −0.440 | 43.028 |
| 0.932 | −0.821 | 43.028 |
| 0.693 | −0.718 | 43.028 |
| 0.238 | −0.414 | 43.028 |
| 1.170 | −0.928 | 43.028 |
| 0.207 | −0.529 | 43.028 |
| 1.096 | −0.599 | 43.028 |
| 1.051 | −0.874 | 43.028 |
| 0.169 | −0.456 | 43.028 |
| 1.218 | −0.626 | 43.028 |
| 1.288 | −0.984 | 43.028 |
| 0.813 | −0.769 | 43.028 |
| 2.563 | −0.931 | 43.028 |
| 1.708 | −0.735 | 43.028 |
| 2.441 | −0.903 | 43.028 |
| 2.319 | −0.874 | 43.028 |
| 1.986 | −1.337 | 43.028 |
| 2.197 | −0.846 | 43.028 |
| 1.871 | −1.276 | 43.028 |
| 1.639 | −1.156 | 43.028 |
| 3.051 | −1.048 | 43.028 |
| 3.225 | −2.059 | 43.028 |
| 2.075 | −0.818 | 43.028 |
| 1.952 | −0.790 | 43.028 |
| 3.114 | −1.990 | 43.028 |
| 3.004 | −1.921 | 43.028 |
| 1.830 | −0.762 | 43.028 |
| 2.929 | −1.018 | 43.028 |
| 2.892 | −1.853 | 43.028 |
| 2.101 | −1.399 | 43.028 |
| 2.781 | −1.786 | 43.028 |
| 1.755 | −1.216 | 43.028 |
| 2.556 | −1.654 | 43.028 |
| 3.172 | −1.078 | 43.028 |
| 2.443 | −1.589 | 43.028 |
| 2.807 | −0.989 | 43.028 |
| 2.329 | −1.525 | 43.028 |
| 2.685 | −0.960 | 43.028 |
| 2.668 | −1.720 | 43.028 |
| 2.215 | −1.461 | 43.028 |
| 4.727 | −3.298 | 43.028 |
| 4.022 | −1.299 | 43.028 |
| 4.178 | −2.743 | 43.028 |
| 4.466 | −3.007 | 43.028 |
| 3.294 | −1.108 | 43.028 |
| 3.974 | −2.580 | 43.028 |
| 3.901 | −1.266 | 43.028 |
| 4.741 | −1.517 | 43.028 |
| 3.870 | −2.501 | 43.028 |
| 3.780 | −1.233 | 43.028 |
| 3.659 | −2.349 | 43.028 |
| 3.658 | −1.201 | 43.028 |
| 4.622 | −1.478 | 43.028 |
| 4.276 | −2.828 | 43.028 |
| 3.552 | −2.274 | 43.028 |
| 3.334 | −2.130 | 43.028 |
| 3.443 | −2.202 | 43.028 |
| 4.644 | −3.198 | 43.028 |
| 4.373 | −2.916 | 43.028 |
| 4.557 | −3.101 | 43.028 |
| 3.765 | −2.424 | 43.028 |
| 4.503 | −1.440 | 43.028 |
| 4.077 | −2.660 | 43.028 |
| 3.416 | −1.139 | 43.028 |
| 4.383 | −1.403 | 43.028 |
| 3.537 | −1.170 | 43.028 |
| 4.263 | −1.368 | 43.028 |
| 4.806 | −3.402 | 43.028 |
| 4.142 | −1.333 | 43.028 |
| 5.549 | −1.857 | 43.028 |
| 5.438 | −1.799 | 43.028 |
| 6.217 | −2.413 | 43.028 |
| 5.244 | −4.045 | 43.028 |
| 5.151 | −3.955 | 43.028 |
| 5.360 | −4.103 | 43.028 |
| 5.607 | −4.098 | 43.028 |
| 5.210 | −1.694 | 43.028 |
| 5.820 | −3.970 | 43.028 |
| 6.374 | −2.883 | 43.028 |
| 6.360 | −2.758 | 43.028 |
| 5.082 | −3.844 | 43.028 |

TABLE I-continued

The coordinate values given below provide the preferred nominal profile envelope information regarding the XYZ coordinates that are optimized for the 1st stage nozzle.

| X | Y | Z |
|---|---|---|
| 5.908 | −3.880 | 43.028 |
| 5.990 | −3.785 | 43.028 |
| 6.280 | −2.522 | 43.028 |
| 6.142 | −2.313 | 43.028 |
| 5.094 | −1.646 | 43.028 |
| 6.067 | −3.687 | 43.028 |
| 4.978 | −1.601 | 43.028 |
| 6.057 | −2.221 | 43.028 |
| 6.140 | −3.585 | 43.028 |
| 6.206 | −3.478 | 43.028 |
| 4.860 | −1.558 | 43.028 |
| 5.484 | −4.119 | 43.028 |
| 4.951 | −3.618 | 43.028 |
| 5.866 | −2.058 | 43.028 |
| 6.264 | −3.367 | 43.028 |
| 4.881 | −3.509 | 43.028 |
| 5.764 | −1.986 | 43.028 |
| 6.312 | −3.251 | 43.028 |
| 5.721 | −4.046 | 43.028 |
| 5.018 | −3.731 | 43.028 |
| 5.658 | −1.919 | 43.028 |
| 6.370 | −3.008 | 43.028 |
| 5.964 | −2.137 | 43.028 |
| 6.348 | −3.131 | 43.028 |
| 6.328 | −2.637 | 43.028 |
| 5.325 | −1.745 | 43.028 |
| 0.115 | −0.467 | 43.628 |
| 0.110 | −0.424 | 43.628 |
| 0.518 | −0.638 | 43.628 |
| 6.339 | −3.234 | 43.628 |
| 3.032 | −1.010 | 43.628 |
| 4.506 | −1.398 | 43.628 |
| 3.877 | −2.477 | 43.628 |
| 5.099 | −3.841 | 43.628 |
| 4.192 | −2.719 | 43.628 |
| 2.649 | −1.697 | 43.628 |
| 1.602 | −1.131 | 43.628 |
| 5.888 | −2.022 | 43.628 |
| 0.395 | −0.590 | 43.628 |
| 0.180 | −0.381 | 43.628 |
| 3.402 | −1.100 | 43.628 |
| 3.526 | −1.130 | 43.628 |
| 6.291 | −3.351 | 43.628 |
| 0.304 | −0.407 | 43.628 |
| 4.384 | −1.362 | 43.628 |
| 2.991 | −1.899 | 43.628 |
| 5.038 | −3.723 | 43.628 |
| 3.984 | −2.556 | 43.628 |
| 0.137 | −0.388 | 43.628 |
| 5.454 | −1.758 | 43.628 |
| 0.272 | −0.542 | 43.628 |
| 5.784 | −1.948 | 43.628 |
| 5.106 | −1.605 | 43.628 |
| 2.785 | −0.952 | 43.628 |
| 6.233 | −3.464 | 43.628 |
| 4.974 | −3.608 | 43.628 |
| 4.262 | −1.326 | 43.628 |
| 1.484 | −1.071 | 43.628 |
| 0.148 | −0.497 | 43.628 |
| 2.909 | −0.981 | 43.628 |
| 6.396 | −2.987 | 43.628 |
| 1.174 | −0.593 | 43.628 |
| 2.661 | −0.923 | 43.628 |
| 2.878 | −1.831 | 43.628 |
| 4.905 | −3.495 | 43.628 |
| 2.535 | −1.631 | 43.628 |
| 1.365 | −1.013 | 43.628 |
| 4.140 | −1.292 | 43.628 |
| 1.546 | −0.674 | 43.628 |
| 1.049 | −0.566 | 43.628 |
| 2.537 | −0.895 | 43.628 |
| 3.329 | −2.107 | 43.628 |
| 3.104 | −1.967 | 43.628 |
| 2.419 | −1.566 | 43.628 |
| 1.246 | −0.956 | 43.628 |
| 5.567 | −1.817 | 43.628 |
| 3.649 | −1.162 | 43.628 |
| 5.506 | −4.119 | 43.628 |
| 4.017 | −1.258 | 43.628 |
| 3.279 | −1.070 | 43.628 |
| 0.925 | −0.540 | 43.628 |
| 3.769 | −2.400 | 43.628 |
| 5.677 | −1.880 | 43.628 |
| 4.579 | −3.079 | 43.628 |
| 2.414 | −0.867 | 43.628 |
| 2.304 | −1.502 | 43.628 |
| 1.126 | −0.900 | 43.628 |
| 5.630 | −4.096 | 43.628 |
| 0.801 | −0.513 | 43.628 |
| 3.661 | −2.325 | 43.628 |
| 4.831 | −3.385 | 43.628 |
| 2.188 | −1.438 | 43.628 |
| 1.005 | −0.846 | 43.628 |
| 6.384 | −2.734 | 43.628 |
| 2.290 | −0.839 | 43.628 |
| 5.745 | −4.042 | 43.628 |
| 1.298 | −0.620 | 43.628 |
| 4.391 | −2.893 | 43.628 |
| 3.551 | −2.251 | 43.628 |
| 3.217 | −2.037 | 43.628 |
| 0.677 | −0.486 | 43.628 |
| 2.072 | −1.375 | 43.628 |
| 6.352 | −2.611 | 43.628 |
| 1.794 | −0.728 | 43.628 |
| 1.422 | −0.647 | 43.628 |
| 1.670 | −0.701 | 43.628 |
| 5.845 | −3.964 | 43.628 |
| 3.440 | −2.179 | 43.628 |
| 3.772 | −1.193 | 43.628 |
| 4.088 | −2.636 | 43.628 |
| 3.895 | −1.225 | 43.628 |
| 0.884 | −0.792 | 43.628 |
| 0.553 | −0.460 | 43.628 |
| 1.955 | −1.313 | 43.628 |
| 5.380 | −4.104 | 43.628 |
| 6.304 | −2.494 | 43.628 |
| 2.042 | −0.783 | 43.628 |
| 5.933 | −3.873 | 43.628 |
| 4.752 | −3.279 | 43.628 |
| 6.375 | −3.112 | 43.628 |
| 1.838 | −1.251 | 43.628 |
| 4.987 | −1.559 | 43.628 |
| 5.340 | −1.704 | 43.628 |
| 0.429 | −0.433 | 43.628 |
| 6.241 | −2.384 | 43.628 |
| 6.016 | −3.776 | 43.628 |
| 5.223 | −1.652 | 43.628 |
| 1.918 | −0.756 | 43.628 |
| 4.868 | −1.516 | 43.628 |
| 6.165 | −2.282 | 43.628 |
| 4.668 | −3.177 | 43.628 |
| 5.262 | −4.046 | 43.628 |
| 6.094 | −3.677 | 43.628 |
| 1.720 | −1.191 | 43.628 |
| 0.763 | −0.739 | 43.628 |
| 4.748 | −1.475 | 43.628 |
| 2.166 | −0.811 | 43.628 |
| 6.079 | −2.188 | 43.628 |
| 2.764 | −1.764 | 43.628 |
| 5.168 | −3.954 | 43.628 |
| 0.641 | −0.688 | 43.628 |
| 6.399 | −2.860 | 43.628 |
| 6.167 | −3.573 | 43.628 |
| 3.156 | −1.040 | 43.628 |
| 4.627 | −1.436 | 43.628 |
| 4.487 | −2.984 | 43.628 |

TABLE I-continued

The coordinate values given below provide the preferred nominal profile envelope information regarding the XYZ coordinates that are optimized for the 1st stage nozzle.

| X | Y | Z |
|---|---|---|
| 4.292 | −2.805 | 43.628 |
| 5.987 | −2.101 | 43.628 |
| 0.600 | −0.635 | 44.228 |
| 0.476 | −0.584 | 44.228 |
| 0.970 | −0.796 | 44.228 |
| 0.063 | −0.366 | 44.228 |
| 0.724 | −0.687 | 44.228 |
| 0.351 | −0.534 | 44.228 |
| 1.515 | −0.621 | 44.228 |
| 1.334 | −0.967 | 44.228 |
| 0.089 | −0.330 | 44.228 |
| 0.385 | −0.377 | 44.228 |
| 1.390 | −0.594 | 44.228 |
| 1.092 | −0.852 | 44.228 |
| 0.847 | −0.741 | 44.228 |
| 0.226 | −0.486 | 44.228 |
| 1.264 | −0.567 | 44.228 |
| 1.139 | −0.539 | 44.228 |
| 1.013 | −0.512 | 44.228 |
| 0.100 | −0.439 | 44.228 |
| 0.259 | −0.350 | 44.228 |
| 0.887 | −0.485 | 44.228 |
| 0.133 | −0.323 | 44.228 |
| 1.213 | −0.909 | 44.228 |
| 0.762 | −0.458 | 44.228 |
| 1.575 | −1.086 | 44.228 |
| 0.510 | −0.404 | 44.228 |
| 0.067 | −0.410 | 44.228 |
| 0.636 | −0.431 | 44.228 |
| 1.455 | −1.026 | 44.228 |
| 2.870 | −1.796 | 44.228 |
| 2.017 | −0.732 | 44.228 |
| 2.754 | −1.728 | 44.228 |
| 2.638 | −1.661 | 44.228 |
| 1.766 | −0.677 | 44.228 |
| 2.268 | −0.789 | 44.228 |
| 2.143 | −0.760 | 44.228 |
| 2.404 | −1.528 | 44.228 |
| 1.641 | −0.649 | 44.228 |
| 3.145 | −0.992 | 44.228 |
| 3.020 | −0.962 | 44.228 |
| 2.287 | −1.463 | 44.228 |
| 2.895 | −0.933 | 44.228 |
| 2.169 | −1.399 | 44.228 |
| 1.892 | −0.704 | 44.228 |
| 2.521 | −1.594 | 44.228 |
| 2.769 | −0.903 | 44.228 |
| 2.051 | −1.335 | 44.228 |
| 2.644 | −0.874 | 44.228 |
| 3.215 | −2.004 | 44.228 |
| 1.933 | −1.271 | 44.228 |
| 2.394 | −0.817 | 44.228 |
| 2.519 | −0.846 | 44.228 |
| 1.814 | −1.209 | 44.228 |
| 1.695 | −1.147 | 44.228 |
| 3.100 | −1.934 | 44.228 |
| 2.985 | −1.865 | 44.228 |
| 4.310 | −2.778 | 44.228 |
| 3.519 | −1.083 | 44.228 |
| 4.855 | −3.369 | 44.228 |
| 3.395 | −1.053 | 44.228 |
| 4.878 | −1.473 | 44.228 |
| 4.775 | −3.261 | 44.228 |
| 4.207 | −2.692 | 44.228 |
| 3.270 | −1.022 | 44.228 |
| 4.756 | −1.431 | 44.228 |
| 4.691 | −3.157 | 44.228 |
| 3.769 | −1.147 | 44.228 |
| 4.634 | −1.392 | 44.228 |
| 3.667 | −2.294 | 44.228 |
| 3.893 | −1.179 | 44.228 |
| 4.511 | −1.354 | 44.228 |
| 4.017 | −1.212 | 44.228 |
| 3.555 | −2.220 | 44.228 |
| 4.388 | −1.317 | 44.228 |
| 3.442 | −2.147 | 44.228 |
| 4.265 | −1.281 | 44.228 |
| 3.329 | −2.075 | 44.228 |
| 4.103 | −2.608 | 44.228 |
| 3.996 | −2.527 | 44.228 |
| 3.887 | −2.448 | 44.228 |
| 3.778 | −2.370 | 44.228 |
| 4.601 | −3.057 | 44.228 |
| 4.508 | −2.960 | 44.228 |
| 4.141 | −1.246 | 44.228 |
| 4.410 | −2.868 | 44.228 |
| 3.644 | −1.115 | 44.228 |
| 6.042 | −3.768 | 44.228 |
| 4.929 | −3.481 | 44.228 |
| 5.586 | −1.778 | 44.228 |
| 5.958 | −3.866 | 44.228 |
| 4.999 | −1.516 | 44.228 |
| 6.264 | −2.356 | 44.228 |
| 5.697 | −1.842 | 44.228 |
| 6.188 | −2.252 | 44.228 |
| 6.318 | −3.336 | 44.228 |
| 5.116 | −3.838 | 44.228 |
| 6.009 | −2.068 | 44.228 |
| 6.102 | −2.157 | 44.228 |
| 5.058 | −3.717 | 44.228 |
| 4.996 | −3.597 | 44.228 |
| 6.260 | −3.451 | 44.228 |
| 5.805 | −1.912 | 44.228 |
| 5.119 | −1.562 | 44.228 |
| 5.281 | −4.046 | 44.228 |
| 6.401 | −3.093 | 44.228 |
| 5.401 | −4.104 | 44.228 |
| 6.421 | −2.967 | 44.228 |
| 5.528 | −4.119 | 44.228 |
| 5.185 | −3.953 | 44.228 |
| 6.366 | −3.217 | 44.228 |
| 6.424 | −2.838 | 44.228 |
| 5.654 | −4.095 | 44.228 |
| 6.194 | −3.561 | 44.228 |
| 5.356 | −1.663 | 44.228 |
| 6.408 | −2.711 | 44.228 |
| 5.769 | −4.038 | 44.228 |
| 5.238 | −1.611 | 44.228 |
| 6.376 | −2.586 | 44.228 |
| 5.869 | −3.959 | 44.228 |
| 5.909 | −1.987 | 44.228 |
| 6.121 | −3.667 | 44.228 |
| 5.472 | −1.718 | 44.228 |
| 6.328 | −2.467 | 44.228 |
| 1.068 | −0.787 | 44.828 |
| 0.820 | −0.674 | 44.828 |
| 0.696 | −0.618 | 44.828 |
| 0.733 | −0.386 | 44.828 |
| 0.987 | −0.442 | 44.828 |
| 0.571 | −0.565 | 44.828 |
| 0.064 | −0.363 | 44.828 |
| 1.494 | −0.555 | 44.828 |
| 0.352 | −0.302 | 44.828 |
| 0.031 | −0.333 | 44.828 |
| 0.860 | −0.414 | 44.828 |
| 0.225 | −0.274 | 44.828 |
| 1.191 | −0.846 | 44.828 |
| 0.479 | −0.330 | 44.828 |
| 0.098 | −0.246 | 44.828 |
| 1.367 | −0.526 | 44.828 |
| 0.606 | −0.358 | 44.828 |
| 0.319 | −0.461 | 44.828 |
| 1.557 | −1.028 | 44.828 |
| 1.313 | −0.906 | 44.828 |
| 0.054 | −0.253 | 44.828 |
| 1.241 | −0.498 | 44.828 |

TABLE I-continued

The coordinate values given below provide the preferred nominal profile envelope information regarding the XYZ coordinates that are optimized for the 1st stage nozzle.

| X | Y | Z |
|---|---|---|
| 0.944 | −0.730 | 44.828 |
| 0.445 | −0.512 | 44.828 |
| 1.435 | −0.967 | 44.828 |
| 0.027 | −0.289 | 44.828 |
| 0.192 | −0.411 | 44.828 |
| 1.114 | −0.470 | 44.828 |
| 2.514 | −1.549 | 44.828 |
| 2.255 | −0.727 | 44.828 |
| 2.761 | −0.845 | 44.828 |
| 2.632 | −1.617 | 44.828 |
| 1.621 | −0.583 | 44.828 |
| 2.277 | −1.415 | 44.828 |
| 1.677 | −1.091 | 44.828 |
| 2.158 | −1.349 | 44.828 |
| 2.128 | −0.698 | 44.828 |
| 2.396 | −1.481 | 44.828 |
| 2.984 | −1.825 | 44.828 |
| 1.798 | −1.154 | 44.828 |
| 2.634 | −0.815 | 44.828 |
| 2.867 | −1.755 | 44.828 |
| 2.001 | −0.669 | 44.828 |
| 1.918 | −1.218 | 44.828 |
| 3.140 | −0.936 | 44.828 |
| 2.508 | −0.786 | 44.828 |
| 1.875 | −0.640 | 44.828 |
| 3.014 | −0.905 | 44.828 |
| 2.750 | −1.685 | 44.828 |
| 2.038 | −1.283 | 44.828 |
| 2.381 | −0.756 | 44.828 |
| 3.217 | −1.966 | 44.828 |
| 1.748 | −0.612 | 44.828 |
| 3.101 | −1.895 | 44.828 |
| 2.887 | −0.875 | 44.828 |
| 3.332 | −2.038 | 44.828 |
| 4.021 | −1.162 | 44.828 |
| 4.429 | −2.844 | 44.828 |
| 3.393 | −0.998 | 44.828 |
| 3.675 | −2.262 | 44.828 |
| 4.521 | −1.306 | 44.828 |
| 3.787 | −2.339 | 44.828 |
| 3.896 | −1.128 | 44.828 |
| 4.798 | −3.243 | 44.828 |
| 3.561 | −2.186 | 44.828 |
| 3.266 | −0.967 | 44.828 |
| 4.713 | −3.137 | 44.828 |
| 4.396 | −1.269 | 44.828 |
| 4.117 | −2.580 | 44.828 |
| 3.770 | −1.094 | 44.828 |
| 3.447 | −2.112 | 44.828 |
| 4.527 | −2.938 | 44.828 |
| 4.891 | −1.428 | 44.828 |
| 4.008 | −2.498 | 44.828 |
| 4.272 | −1.232 | 44.828 |
| 3.898 | −2.417 | 44.828 |
| 4.223 | −2.665 | 44.828 |
| 3.644 | −1.062 | 44.828 |
| 4.768 | −1.386 | 44.828 |
| 4.147 | −1.196 | 44.828 |
| 4.878 | −3.354 | 44.828 |
| 3.519 | −1.030 | 44.828 |
| 4.622 | −3.035 | 44.828 |
| 4.327 | −2.753 | 44.828 |
| 4.645 | −1.345 | 44.828 |
| 6.345 | −3.323 | 44.828 |
| 5.716 | −1.807 | 44.828 |
| 6.448 | −2.818 | 44.828 |
| 5.550 | −4.119 | 44.828 |
| 5.134 | −1.520 | 44.828 |
| 6.432 | −2.689 | 44.828 |
| 6.067 | −3.761 | 44.828 |
| 6.123 | −2.128 | 44.828 |
| 6.392 | −3.202 | 44.828 |
| 5.604 | −1.741 | 44.828 |
| 5.677 | −4.094 | 44.828 |
| 6.399 | −2.564 | 44.828 |
| 5.013 | −1.473 | 44.828 |
| 5.132 | −3.835 | 44.828 |
| 6.147 | −3.658 | 44.828 |
| 6.029 | −2.038 | 44.828 |
| 6.427 | −3.077 | 44.828 |
| 5.490 | −1.680 | 44.828 |
| 5.077 | −3.710 | 44.828 |
| 5.792 | −4.035 | 44.828 |
| 6.350 | −2.444 | 44.828 |
| 5.017 | −3.588 | 44.828 |
| 6.221 | −3.551 | 44.828 |
| 5.930 | −1.955 | 44.828 |
| 5.373 | −1.623 | 44.828 |
| 5.299 | −4.046 | 44.828 |
| 4.951 | −3.469 | 44.828 |
| 5.893 | −3.954 | 44.828 |
| 6.286 | −2.331 | 44.828 |
| 5.202 | −3.952 | 44.828 |
| 6.287 | −3.439 | 44.828 |
| 5.825 | −1.878 | 44.828 |
| 5.421 | −4.105 | 44.828 |
| 5.254 | −1.570 | 44.828 |
| 5.983 | −3.860 | 44.828 |
| 6.209 | −2.226 | 44.828 |
| 6.446 | −2.948 | 44.828 |
| 0.462 | −0.253 | 45.428 |
| 0.428 | −0.436 | 45.428 |
| 1.612 | −0.516 | 45.428 |
| 0.932 | −0.660 | 45.428 |
| 0.973 | −0.369 | 45.428 |
| 0.301 | −0.384 | 45.428 |
| 0.007 | −0.208 | 45.428 |
| 0.334 | −0.224 | 45.428 |
| 1.484 | −0.487 | 45.428 |
| 0.845 | −0.340 | 45.428 |
| 0.172 | −0.332 | 45.428 |
| 0.207 | −0.195 | 45.428 |
| 0.044 | −0.283 | 45.428 |
| 1.550 | −0.967 | 45.428 |
| 1.356 | −0.457 | 45.428 |
| 1.427 | −0.903 | 45.428 |
| 0.718 | −0.311 | 45.428 |
| 0.807 | −0.602 | 45.428 |
| 1.181 | −0.780 | 45.428 |
| 0.079 | −0.166 | 45.428 |
| 1.057 | −0.719 | 45.428 |
| 0.011 | −0.252 | 45.428 |
| 1.229 | −0.428 | 45.428 |
| 0.035 | −0.173 | 45.428 |
| 0.590 | −0.282 | 45.428 |
| 0.681 | −0.546 | 45.428 |
| 1.304 | −0.841 | 45.428 |
| 2.249 | −0.665 | 45.428 |
| 1.914 | −1.162 | 45.428 |
| 3.222 | −1.931 | 45.428 |
| 3.105 | −1.858 | 45.428 |
| 1.793 | −1.096 | 45.428 |
| 2.988 | −1.785 | 45.428 |
| 2.759 | −0.788 | 45.428 |
| 2.122 | −0.635 | 45.428 |
| 2.870 | −1.714 | 45.428 |
| 1.672 | −1.031 | 45.428 |
| 2.632 | −0.757 | 45.428 |
| 2.633 | −1.572 | 45.428 |
| 1.994 | −0.605 | 45.428 |
| 3.141 | −0.882 | 45.428 |
| 2.514 | −1.502 | 45.428 |
| 2.504 | −0.726 | 45.428 |
| 2.395 | −1.433 | 45.428 |
| 1.867 | −0.575 | 45.428 |
| 2.276 | −1.364 | 45.428 |

TABLE I-continued

The coordinate values given below provide the preferred nominal profile envelope information regarding the XYZ coordinates that are optimized for the 1st stage nozzle.

| X | Y | Z |
|---|---|---|
| 3.013 | −0.850 | 45.428 |
| 2.156 | −1.296 | 45.428 |
| 2.377 | −0.696 | 45.428 |
| 2.035 | −1.229 | 45.428 |
| 1.739 | −0.546 | 45.428 |
| 0.555 | −0.490 | 45.428 |
| 2.752 | −1.642 | 45.428 |
| 2.886 | −0.819 | 45.428 |
| 1.101 | −0.399 | 45.428 |
| 4.027 | −1.117 | 45.428 |
| 3.339 | −2.005 | 45.428 |
| 3.395 | −0.947 | 45.428 |
| 4.818 | −3.230 | 45.428 |
| 4.529 | −1.267 | 45.428 |
| 3.901 | −1.081 | 45.428 |
| 4.640 | −3.020 | 45.428 |
| 4.544 | −2.921 | 45.428 |
| 3.268 | −0.914 | 45.428 |
| 4.445 | −2.825 | 45.428 |
| 4.732 | −3.123 | 45.428 |
| 4.404 | −1.228 | 45.428 |
| 4.342 | −2.733 | 45.428 |
| 3.775 | −1.047 | 45.428 |
| 4.129 | −2.558 | 45.428 |
| 4.020 | −2.474 | 45.428 |
| 4.279 | −1.190 | 45.428 |
| 3.797 | −2.312 | 45.428 |
| 3.909 | −2.392 | 45.428 |
| 3.648 | −1.013 | 45.428 |
| 4.778 | −1.349 | 45.428 |
| 6.371 | −3.314 | 45.428 |
| 5.729 | −1.785 | 45.428 |
| 4.899 | −3.343 | 45.428 |
| 5.571 | −4.119 | 45.428 |
| 6.453 | −2.674 | 45.428 |
| 5.146 | −1.488 | 45.428 |
| 6.092 | −3.755 | 45.428 |
| 6.138 | −2.110 | 45.428 |
| 6.418 | −3.191 | 45.428 |
| 5.617 | −1.717 | 45.428 |
| 5.699 | −4.092 | 45.428 |
| 6.418 | −2.548 | 45.428 |
| 5.024 | −1.439 | 45.428 |
| 5.095 | −3.706 | 45.428 |
| 6.172 | −3.652 | 45.428 |
| 6.043 | −2.020 | 45.428 |
| 5.038 | −3.580 | 45.428 |
| 6.452 | −3.065 | 45.428 |
| 5.502 | −1.654 | 45.428 |
| 5.219 | −3.951 | 45.428 |
| 5.815 | −4.032 | 45.428 |
| 6.368 | −2.427 | 45.428 |
| 4.901 | −1.393 | 45.428 |
| 5.148 | −3.833 | 45.428 |
| 6.246 | −3.544 | 45.428 |
| 5.943 | −1.935 | 45.428 |
| 6.470 | −2.935 | 45.428 |
| 5.385 | −1.595 | 45.428 |
| 4.972 | −3.459 | 45.428 |
| 5.917 | −3.950 | 45.428 |
| 6.302 | −2.314 | 45.428 |
| 5.318 | −4.047 | 45.428 |
| 6.313 | −3.431 | 45.428 |
| 5.838 | −1.857 | 45.428 |
| 4.153 | −1.153 | 45.428 |
| 3.684 | −2.233 | 45.428 |
| 5.441 | −4.106 | 45.428 |
| 6.471 | −2.804 | 45.428 |
| 5.266 | −1.540 | 45.428 |
| 3.521 | −0.980 | 45.428 |
| 3.569 | −2.156 | 45.428 |
| 6.007 | −3.855 | 45.428 |
| 6.225 | −2.208 | 45.428 |
| 4.654 | −1.307 | 45.428 |
| 4.237 | −2.644 | 45.428 |
| 3.454 | −2.080 | 45.428 |
| 0.455 | −0.177 | 46.028 |
| −0.002 | −0.127 | 46.028 |
| 0.549 | −0.416 | 46.028 |
| 0.802 | −0.532 | 46.028 |
| 0.421 | −0.361 | 46.028 |
| 0.968 | −0.298 | 46.028 |
| 1.609 | −0.451 | 46.028 |
| 0.293 | −0.306 | 46.028 |
| 1.054 | −0.652 | 46.028 |
| 0.327 | −0.147 | 46.028 |
| 0.164 | −0.254 | 46.028 |
| 1.178 | −0.714 | 46.028 |
| 1.481 | −0.420 | 46.028 |
| 0.034 | −0.202 | 46.028 |
| 0.001 | −0.172 | 46.028 |
| 1.426 | −0.842 | 46.028 |
| 0.840 | −0.268 | 46.028 |
| 0.199 | −0.116 | 46.028 |
| 1.353 | −0.390 | 46.028 |
| 0.712 | −0.237 | 46.028 |
| 0.070 | −0.086 | 46.028 |
| 0.676 | −0.473 | 46.028 |
| 1.303 | −0.777 | 46.028 |
| 1.225 | −0.359 | 46.028 |
| 0.928 | −0.591 | 46.028 |
| 0.584 | −0.207 | 46.028 |
| 1.549 | −0.907 | 46.028 |
| 1.097 | −0.328 | 46.028 |
| 0.026 | −0.093 | 46.028 |
| 2.991 | −1.753 | 46.028 |
| 2.250 | −0.607 | 46.028 |
| 2.157 | −1.247 | 46.028 |
| 2.636 | −1.532 | 46.028 |
| 2.755 | −1.605 | 46.028 |
| 2.761 | −0.734 | 46.028 |
| 2.122 | −0.575 | 46.028 |
| 2.277 | −1.317 | 46.028 |
| 1.794 | −1.041 | 46.028 |
| 3.226 | −1.903 | 46.028 |
| 2.634 | −0.702 | 46.028 |
| 1.915 | −1.109 | 46.028 |
| 1.994 | −0.544 | 46.028 |
| 3.144 | −0.832 | 46.028 |
| 2.036 | −1.177 | 46.028 |
| 2.517 | −1.460 | 46.028 |
| 2.506 | −0.670 | 46.028 |
| 2.397 | −1.388 | 46.028 |
| 1.866 | −0.513 | 46.028 |
| 1.672 | −0.973 | 46.028 |
| 3.017 | −0.799 | 46.028 |
| 3.109 | −1.827 | 46.028 |
| 2.378 | −0.638 | 46.028 |
| 1.738 | −0.482 | 46.028 |
| 2.873 | −1.678 | 46.028 |
| 2.889 | −0.767 | 46.028 |
| 4.034 | −1.077 | 46.028 |
| 3.399 | −0.900 | 46.028 |
| 4.537 | −1.234 | 46.028 |
| 4.746 | −3.115 | 46.028 |
| 4.351 | −2.723 | 46.028 |
| 4.455 | −2.816 | 46.028 |
| 3.908 | −1.040 | 46.028 |
| 4.653 | −3.011 | 46.028 |
| 4.026 | −2.459 | 46.028 |
| 4.834 | −3.223 | 46.028 |
| 3.272 | −0.866 | 46.028 |
| 4.412 | −1.193 | 46.028 |
| 4.244 | −2.633 | 46.028 |
| 3.342 | −1.979 | 46.028 |
| 3.781 | −1.004 | 46.028 |

TABLE I-continued

The coordinate values given below provide the preferred nominal profile envelope information regarding the XYZ coordinates that are optimized for the 1st stage nozzle.

| X | Y | Z |
|---|---|---|
| 4.136 | −2.545 | 46.028 |
| 3.459 | −2.056 | 46.028 |
| 4.286 | −1.153 | 46.028 |
| 3.654 | −0.969 | 46.028 |
| 4.786 | −1.321 | 46.028 |
| 3.688 | −2.213 | 46.028 |
| 3.574 | −2.134 | 46.028 |
| 4.160 | −1.115 | 46.028 |
| 3.802 | −2.294 | 46.028 |
| 3.527 | −0.934 | 46.028 |
| 4.556 | −2.912 | 46.028 |
| 4.662 | −1.277 | 46.028 |
| 3.915 | −2.376 | 46.028 |
| 6.397 | −3.307 | 46.028 |
| 5.737 | −1.771 | 46.028 |
| 5.592 | −4.119 | 46.028 |
| 6.472 | −2.664 | 46.028 |
| 5.154 | −1.466 | 46.028 |
| 6.116 | −3.751 | 46.028 |
| 6.148 | −2.100 | 46.028 |
| 6.443 | −3.184 | 46.028 |
| 5.625 | −1.702 | 46.028 |
| 5.721 | −4.092 | 46.028 |
| 6.435 | −2.538 | 46.028 |
| 5.033 | −1.415 | 46.028 |
| 6.197 | −3.648 | 46.028 |
| 6.053 | −2.009 | 46.028 |
| 6.476 | −3.057 | 46.028 |
| 5.510 | −1.638 | 46.028 |
| 5.837 | −4.031 | 46.028 |
| 6.382 | −2.417 | 46.028 |
| 4.910 | −1.366 | 46.028 |
| 5.336 | −4.047 | 46.028 |
| 6.271 | −3.539 | 46.028 |
| 5.952 | −1.924 | 46.028 |
| 6.494 | −2.926 | 46.028 |
| 5.393 | −1.577 | 46.028 |
| 5.236 | −3.952 | 46.028 |
| 5.113 | −3.703 | 46.028 |
| 4.991 | −3.453 | 46.028 |
| 5.939 | −3.947 | 46.028 |
| 6.315 | −2.304 | 46.028 |
| 5.165 | −3.832 | 46.028 |
| 6.339 | −3.426 | 46.028 |
| 5.847 | −1.845 | 46.028 |
| 5.462 | −4.106 | 46.028 |
| 6.492 | −2.794 | 46.028 |
| 5.274 | −1.520 | 46.028 |
| 5.057 | −3.575 | 46.028 |
| 6.030 | −3.852 | 46.028 |
| 6.236 | −2.198 | 46.028 |
| 4.916 | −3.335 | 46.028 |
| 0.478 | −0.097 | 46.628 |
| 0.020 | −0.044 | 46.628 |
| 0.023 | −0.088 | 46.628 |
| 1.575 | −0.839 | 46.628 |
| 0.991 | −0.222 | 46.628 |
| 0.349 | −0.066 | 46.628 |
| 1.328 | −0.706 | 46.628 |
| 1.505 | −0.349 | 46.628 |
| 1.204 | −0.642 | 46.628 |
| 0.863 | −0.191 | 46.628 |
| 1.079 | −0.578 | 46.628 |
| 0.444 | −0.281 | 46.628 |
| 0.827 | −0.455 | 46.628 |
| 0.221 | −0.034 | 46.628 |
| 0.572 | −0.338 | 46.628 |
| 0.953 | −0.516 | 46.628 |
| 1.377 | −0.317 | 46.628 |
| 0.056 | −0.119 | 46.628 |
| 0.735 | −0.160 | 46.628 |
| 0.093 | −0.003 | 46.628 |
| 0.048 | −0.009 | 46.628 |
| 1.248 | −0.286 | 46.628 |
| 1.452 | −0.772 | 46.628 |
| 0.606 | −0.128 | 46.628 |
| 0.700 | −0.396 | 46.628 |
| 0.186 | −0.171 | 46.628 |
| 1.120 | −0.254 | 46.628 |
| 0.315 | −0.225 | 46.628 |
| 2.274 | −0.542 | 46.628 |
| 1.633 | −0.381 | 46.628 |
| 2.894 | −1.639 | 46.628 |
| 2.786 | −0.674 | 46.628 |
| 3.011 | −1.717 | 46.628 |
| 1.698 | −0.907 | 46.628 |
| 2.146 | −0.509 | 46.628 |
| 2.776 | −1.562 | 46.628 |
| 2.658 | −0.640 | 46.628 |
| 2.018 | −0.477 | 46.628 |
| 3.170 | −0.775 | 46.628 |
| 3.243 | −1.874 | 46.628 |
| 2.659 | −1.486 | 46.628 |
| 2.530 | −0.607 | 46.628 |
| 2.540 | −1.411 | 46.628 |
| 1.890 | −0.445 | 46.628 |
| 3.042 | −0.741 | 46.628 |
| 2.422 | −1.336 | 46.628 |
| 2.302 | −1.263 | 46.628 |
| 2.402 | −0.574 | 46.628 |
| 2.183 | −1.190 | 46.628 |
| 2.062 | −1.118 | 46.628 |
| 1.761 | −0.413 | 46.628 |
| 1.941 | −1.047 | 46.628 |
| 2.914 | −0.707 | 46.628 |
| 3.127 | −1.795 | 46.628 |
| 1.820 | −0.976 | 46.628 |
| 4.059 | −1.029 | 46.628 |
| 3.425 | −0.845 | 46.628 |
| 4.466 | −2.812 | 46.628 |
| 4.562 | −1.194 | 46.628 |
| 4.361 | −2.719 | 46.628 |
| 3.933 | −0.991 | 46.628 |
| 4.255 | −2.627 | 46.628 |
| 3.297 | −0.810 | 46.628 |
| 4.146 | −2.538 | 46.628 |
| 4.437 | −1.151 | 46.628 |
| 3.806 | −0.953 | 46.628 |
| 4.568 | −2.909 | 46.628 |
| 4.037 | −2.451 | 46.628 |
| 3.701 | −2.198 | 46.628 |
| 3.473 | −2.034 | 46.628 |
| 4.311 | −1.109 | 46.628 |
| 3.814 | −2.281 | 46.628 |
| 4.666 | −3.008 | 46.628 |
| 3.679 | −0.917 | 46.628 |
| 3.587 | −2.115 | 46.628 |
| 4.810 | −1.286 | 46.628 |
| 4.186 | −1.069 | 46.628 |
| 4.851 | −3.219 | 46.628 |
| 3.358 | −1.954 | 46.628 |
| 3.552 | −0.881 | 46.628 |
| 4.761 | −3.112 | 46.628 |
| 3.926 | −2.365 | 46.628 |
| 4.686 | −1.239 | 46.628 |
| 6.247 | −2.196 | 46.628 |
| 5.294 | −1.497 | 46.628 |
| 6.512 | −2.791 | 46.628 |
| 5.613 | −4.119 | 46.628 |
| 6.363 | −3.424 | 46.628 |
| 5.482 | −4.107 | 46.628 |
| 6.326 | −2.302 | 46.628 |
| 5.859 | −4.030 | 46.628 |
| 6.516 | −2.923 | 46.628 |
| 5.964 | −1.918 | 46.628 |
| 6.296 | −3.538 | 46.628 |

TABLE I-continued

The coordinate values given below provide the preferred nominal profile envelope information regarding the XYZ coordinates that are optimized for the 1st stage nozzle.

| X | Y | Z |
|---|---|---|
| 5.355 | −4.048 | 46.628 |
| 5.253 | −3.953 | 46.628 |
| 5.528 | −1.622 | 46.625 |
| 6.395 | −2.415 | 46.628 |
| 5.860 | −1.837 | 46.628 |
| 5.960 | −3.946 | 46.628 |
| 6.500 | −3.054 | 46.628 |
| 5.054 | −1.386 | 46.628 |
| 6.064 | −2.005 | 46.628 |
| 6.220 | −3.646 | 46.628 |
| 4.935 | −3.332 | 46.628 |
| 5.131 | −3.702 | 46.628 |
| 6.450 | −2.535 | 46.628 |
| 5.011 | −3.449 | 46.628 |
| 6.052 | −3.850 | 46.628 |
| 6.468 | −3.182 | 46.628 |
| 5.077 | −3.573 | 46.628 |
| 5.412 | −1.558 | 46.628 |
| 5.742 | −4.091 | 46.628 |
| 6.159 | −2.097 | 46.628 |
| 6.138 | −3.750 | 46.628 |
| 6.490 | −2.661 | 46.628 |
| 5.641 | −1.689 | 46.628 |
| 4.933 | −1.335 | 46.628 |
| 5.175 | −1.440 | 46.628 |
| 6.421 | −3.306 | 46.628 |
| 5.752 | −1.761 | 46.628 |
| 5.181 | −3.833 | 46.628 |

While the invention has been described in connection with what is presently considered to be the most practical and preferred embodiment, it is to be understood that the invention is not to be limited to the disclosed embodiment. On the contrary, is intended to cover various modifications and equivalent arrangements included within the spirit and scope of the appended claims.

What is claimed is:

1. An article of manufacture, the article having a nominal profile substantially in accordance with Cartesian coordinate values of X, Y and Z set forth in a TABLE I, and wherein X and Y are distances in inches which, when connected by smooth continuing arcs, define airfoil profile sections at each distance Z in inches, the profile sections at the Z distances being joined smoothly with one another to form a complete airfoil shape.

2. The article of manufacture according to claim 1, wherein the article comprises an airfoil.

3. The article of manufacture according to claim 2, wherein said article shape lies in an envelope within +0.130 inch to −0.030 inch in a direction normal to any article surface location.

4. The article of manufacture according to claim 1, wherein the article comprises a stator.

5. A turbine comprising a turbine stage having a plurality of articles of manufacture, each of said articles of manufacture including an airfoil having an airfoil shape, said airfoil having a nominal profile substantially in accordance with Cartesian coordinate values of X, Y and Z set forth in a TABLE 1, wherein X and Y are distances in inches which, when connected by smooth continuing arcs, define the airfoil profile sections at each distance Z in inches, the profile sections at the Z distances being joined smoothly with one another to form a complete airfoil shape.

6. The turbine according to claim 5, wherein the article of manufacture comprises a stator.

7. The turbine according to claim 5, wherein the airfoil shape lies in an envelope within +0.130 inch to −0.030 inch in a direction normal to any airfoil surface location.

8. A turbine comprising a turbine stage having a plurality of articles of manufacture, each of said articles of manufacture including an airfoil having a nominal airfoil profile substantially in accordance with Cartesian coordinate values of X, Y, and Z set forth in TABLE 1, wherein X and Y are distances in inches which, when connected by smooth continuing arcs, define airfoil profile sections at each distance Z in inches, the profile sections at the Z distances being joined smoothly with one another to form a complete airfoil shape, the X, Y and Z distances being scalable as a function of the same constant or number to provide a scaled-up or scaled-down nozzle airfoil.

9. The turbine according to claim 8, wherein the article of manufacture comprises a stator.

10. The turbine according to claim 8, wherein the airfoil shape lies in an envelope within +0.130 inch to −0.030 inch in a direction normal to any airfoil surface location.

* * * * *